United States Patent [19]
Ishizuka et al.

[11] Patent Number: 5,946,032
[45] Date of Patent: *Aug. 31, 1999

[54] CAMERA SHAKE CORRECTING APPARATUS HAVING DAMPING COILS FOR YAW AND PITCH

[75] Inventors: Shigeki Ishizuka, Kanagawa; Koichi Sato, Tokyo; Akira Nikami; Mitsuru Sato, both of Kanagawa, all of Japan

[73] Assignee: Sony Corporation, Tokyo, Japan

[ * ] Notice: This patent is subject to a terminal disclaimer.

[21] Appl. No.: 08/823,150

[22] Filed: Mar. 25, 1997

Related U.S. Application Data

[62] Division of application No. 08/331,339, Oct. 28, 1994, which is a continuation of application No. 08/012,052, Jan. 29, 1993.

[30] Foreign Application Priority Data

Jan. 31, 1992 [JP] Japan ............... P04-016968
Mar. 19, 1992 [JP] Japan ............... P04-063905

[51] Int. Cl.$^6$ ............. H04N 5/228; H04N 9/07; H04N 5/225; G03B 17/00
[52] U.S. Cl. ............. 348/208; 348/337; 348/374; 396/55
[58] Field of Search .............. 348/337, 207, 348/208, 335, 374; 396/52, 55

[56] References Cited

U.S. PATENT DOCUMENTS

| | | | |
|---|---|---|---|
| 5,107,293 | 4/1992 | Sekine et al. | 348/208 |
| 5,170,255 | 12/1992 | Yamada et al. | 348/208 |
| 5,181,056 | 1/1993 | Noguchi et al. | 396/55 |
| 5,587,737 | 12/1996 | Sekine et al. | 348/208 |
| 5,623,305 | 4/1997 | Ishizuka et al. | 348/208 |
| 5,657,080 | 8/1997 | Sekine | 348/208 |
| 5,734,933 | 3/1998 | Sekine et al. | 348/208 |

*Primary Examiner*—Wendy Garber
*Assistant Examiner*—Luong Nguyen
*Attorney, Agent, or Firm*—Jay H. Maioli

[57] ABSTRACT

A camera shake correcting apparatus includes a variable angular prism assembly, a microcomputer to produce signals for driving the variable angular prism assembly, prism actuators, vertical angle sensors, angular velocity sensors for detecting an angular velocity caused by the camera shaking, and damping coils. The variable angular prism assembly is driven by a signal obtained by subtracting detected results of the vertical angle sensors from detected results of the angular velocity sensors. A damping coil is used to produce rotational angular velocity signals so that a nonlinearity of the prism can be alleviated. The phase margin of the servo characteristic of the prism drive system is increased, so that the camera shake correcting apparatus can be generally independent of variations in values and dimensions that occur in mass-production manufacturing operations and free of dependency on temperature characteristics.

4 Claims, 20 Drawing Sheets

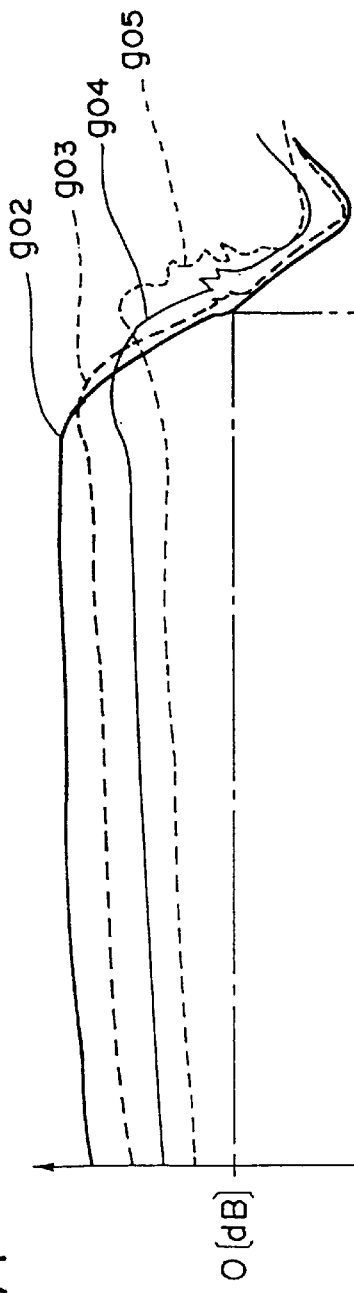
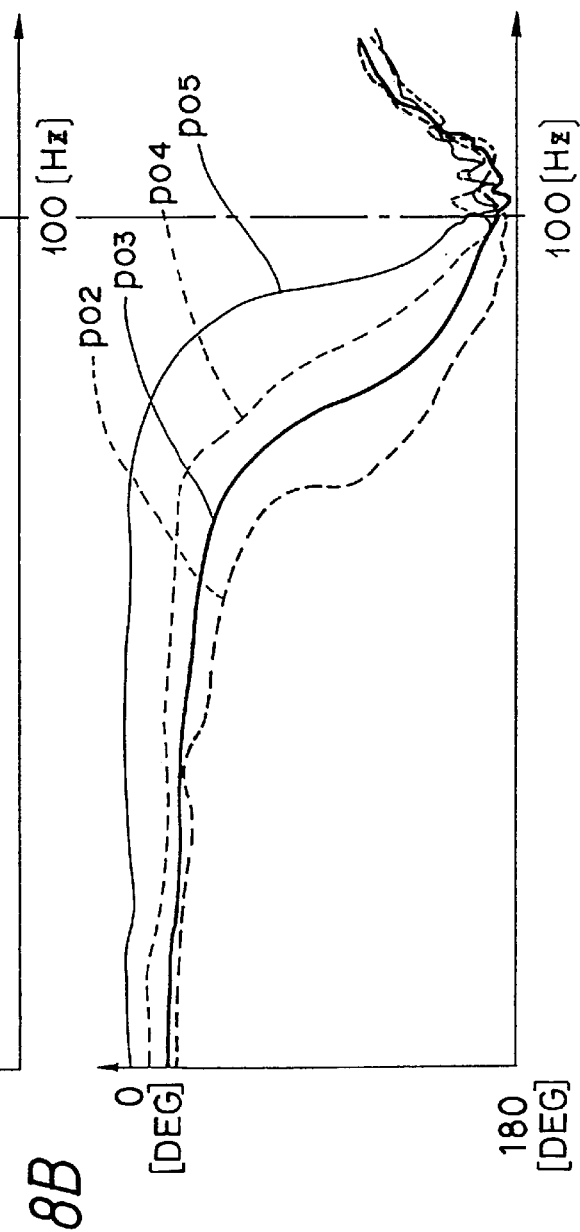
FIG. 8A
FIG. 8B

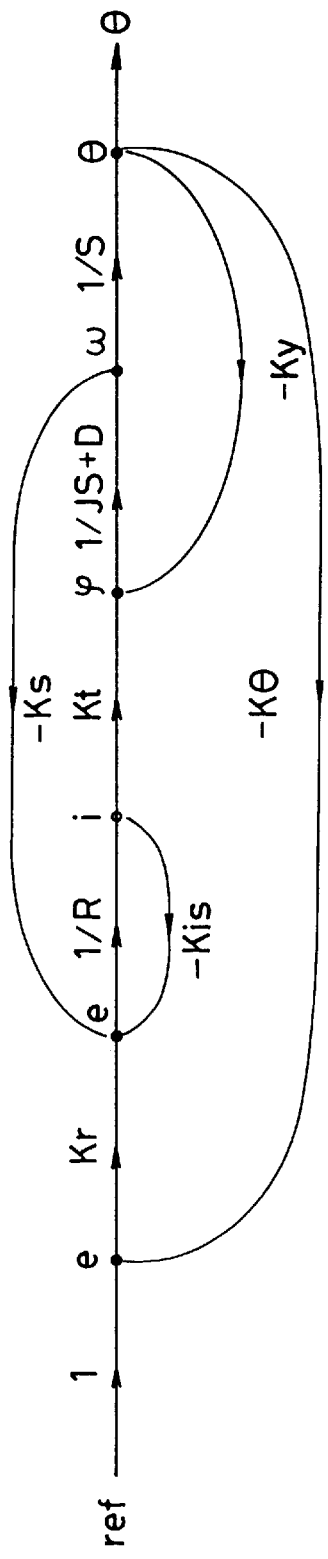

CAMERA SHAKE CORRECTING APPARATUS HAVING DAMPING COILS FOR YAW AND PITCH

This is a division of application Ser. No. 08/331,339 filed Oct. 28, 1994, which is a continuation of application Ser. No. 08/012,052 filed Jan. 29, 1993.

BACKGROUND OF THE INVENTION

1. Field of the Invention

The present invention relates to a camera shake correcting apparatus for use in a camera having a built-in video tape recorder.

2. Description of the Background

U.S. Pat. Nos. 5,016,112 and 4,998,162 both describe video cameras and U.S. Pat. No. 4,542,419 describes a recording and reproducing apparatus for use in a video camera. Conventional video cameras all require some sort of camera shake correction, and U.S. patent application Ser. No. 673,783, assigned to the assignee hereof, describes camera shake correcting processing circuitry for video cameras, for example.

Camera shake is the undesired effect that occurs when the cameraman takes a picture of an object with a video camera and the detected image moves in the up, down, right, or left directions as caused by the unintentional shaking action of cameraman's hands or body. The detected image may also move in a complex fashion, such as when it moves in oblique or circular directions or the like. More specifically, if the video camera is moved delicately or moved coarsely, depending on differences among individuals, then the light from an object is moved on a target screen of a charge coupled device (CCD) in various corresponding directions, such as up, down, right, and left, so that when the detected image is reproduced on the picture screen of a television monitor or the like, the reproduced picture is constantly moved in the same up, down, right, left, or oblique directions and appears to shake.

FIG. 1 shows an arrangement of a conventional video tape recorder having a built-in camera and including a camera shake correction system. In the system of FIG. 1 the elements are labelled with their conventional functions and, a motion vector of a picture that is moved by reason of the camera shaking is detected and the address of a cut-out frame of the CCD image is changed, thereby correcting the camera shake. The picture is cut out from the CCD scanning area by changing the cut-out frame so that an area in which the cut-out frame is moved in response to the camera shake must be prepared within the CCD scanning area. As a result, the scanning area is substantially reduced in size. To solve this problem, the picture area whose picture frame is reduced is zoomed up or enlarged by digital signal processing and extended to the normal picture frame. There are then present the disadvantages that the picture size is changed and the resolution of the reproduced picture is lowered.

OBJECTS AND SUMMARY OF THE INVENTION

In view of the aforesaid shortcomings and disadvantages encountered with the prior art, it is an object of the present invention to provide a camera shake correction system that can overcome the drawbacks inherent in previously proposed cameras.

It is a further object of the present invention to provide a camera shake correcting apparatus that can increase a phase margin of the servo characteristic of the shake correction system in the camera.

It is another object of the present invention to provide a camera shake correcting apparatus that can correct the effects of camera shake optically.

It is still another object of the present invention to provide a camera shake correcting apparatus that can be prevented from being affected by variations in values and dimensions of the several elements that may occur in a mass-production manufacturing operation.

It is a further object of the present invention to provide a camera shake correcting apparatus that can be prevented from being affected by a dependency on the temperature characteristics of the several elements in the apparatus.

According to a first aspect of the present invention, there is provided a camera shake correcting apparatus that comprises a variable angular prism for changing a vertical angle of the image by rotating a glass plate thereof in response to a drive signal to thereby refract incident light from the image, a vertical angle prism position detecting circuit for detecting a rotational angle position of the glass plate, a camera shake amount detecting circuit for detecting the amount of camera shake, a calculating circuit for calculating the camera shake amount and the rotational angle position of the plate glass of the prism to generate and output a vertical angle prism drive signal, and a variable angular prism drive circuit for driving the vertical angle prism in response to a vertical angle prism drive signal.

According to a second aspect of the present invention, there is provided a camera apparatus that comprises a variable angular prism in which a rotational angle of a glass plate thereof is changed in response to a drive signal to thereby refract incident light and change a vertical angle of a detected image, a vertical angle prism position detecting circuit for detecting the rotational angle position of the glass plate of the prism, a camera shake amount detecting circuit for detecting an amount of camera shake, a calculating circuit for calculating the camera shake amount and the rotational angle position of the glass plate to generate and output a vertical angle prism drive signal, a variable angular prism drive circuit for driving the vertical angle prism in response to the vertical angle prism drive signal, and an image-pickup device for focusing light traveling through the variable angular prism from an object and to convert same into a video signal.

According to a third aspect of the present invention, there is provided a recording apparatus having a built-in camera that comprises a variable angular prism for changing a vertical angle of an image by changing a rotational angle of a glass plate forming part of the prism in response to a drive signal to thereby refract incident light, a vertical angle prism position detecting circuit for detecting a rotational angle position of the glass plate, a camera shake amount detecting circuit for detecting the amount the camera is shaking, a calculating circuit for calculating the camera shake amount and the rotational angle position of the glass plate to generate and output a vertical angle prism drive signal, a variable angular prism drive circuit for driving the vertical angle prism in response to the vertical angle prism drive signal, an image-pickup device for focusing light traveling through the variable angular prism from an object and converting the same into a video signal, and a recording circuit for converting an output video signal from the image-pickup device into a signal format for recording and recording the same on a record medium.

The above and other objects, features, and advantages of the present invention will become apparent from the following detailed description of illustrative embodiments thereof to be read in conjunction with the accompanying drawings, in which like reference numerals are used to identify the same or similar parts in the several views.

BRIEF DESCRIPTION OF THE DRAWINGS

FIGS. 8A and 8B are graphs used to explain the operation of the camera shake correcting apparatus according to the circuit of FIG. 2;

FIG. 27 is a signal flow diagram used to explain the operation of the camera shake correcting apparatus shown in FIG. 24;

FIG. 28 is a signal flow diagram used to explain the operation of the camera shake correcting apparatus shown in FIG. 24;

DETAILED DESCRIPTION OF THE PREFERRED EMBODIMENTS

In order to eliminate the aforesaid drawbacks, according to the present invention, the effects of camera shake are optically corrected before an image is focused on the CCD image sensing element. As a means for optically correcting a camera shake, there is utilized a specialized prism that is what might be called a variable angular prism (VAP) assembly.

As will be described hereinbelow, this variable angular prism assembly comprises two circular glass plates bonded by a cylindrical transparent spring portion having a bellows-like configuration and whose diameter is substantially equal to the diameters of the two glass plates. The bellows-like spring portion is filled with a transparent viscous liquid and a vertical angle of this prism is changed by mechanically changing the relative angle between the two glass plates, thereby changing the refraction angle of light passed therethrough. Then, by respectively moving the glass platen of the prism in the horizontal or vertical directions in response to an amount in which the angular velocity is changed due to shaking of the camera, the light is refracted based on the amount of camera movement and the image is prevented from moving on the target screen of the CCD device, thereby correcting the adverse effects of the camera shaking.

Figure 1:
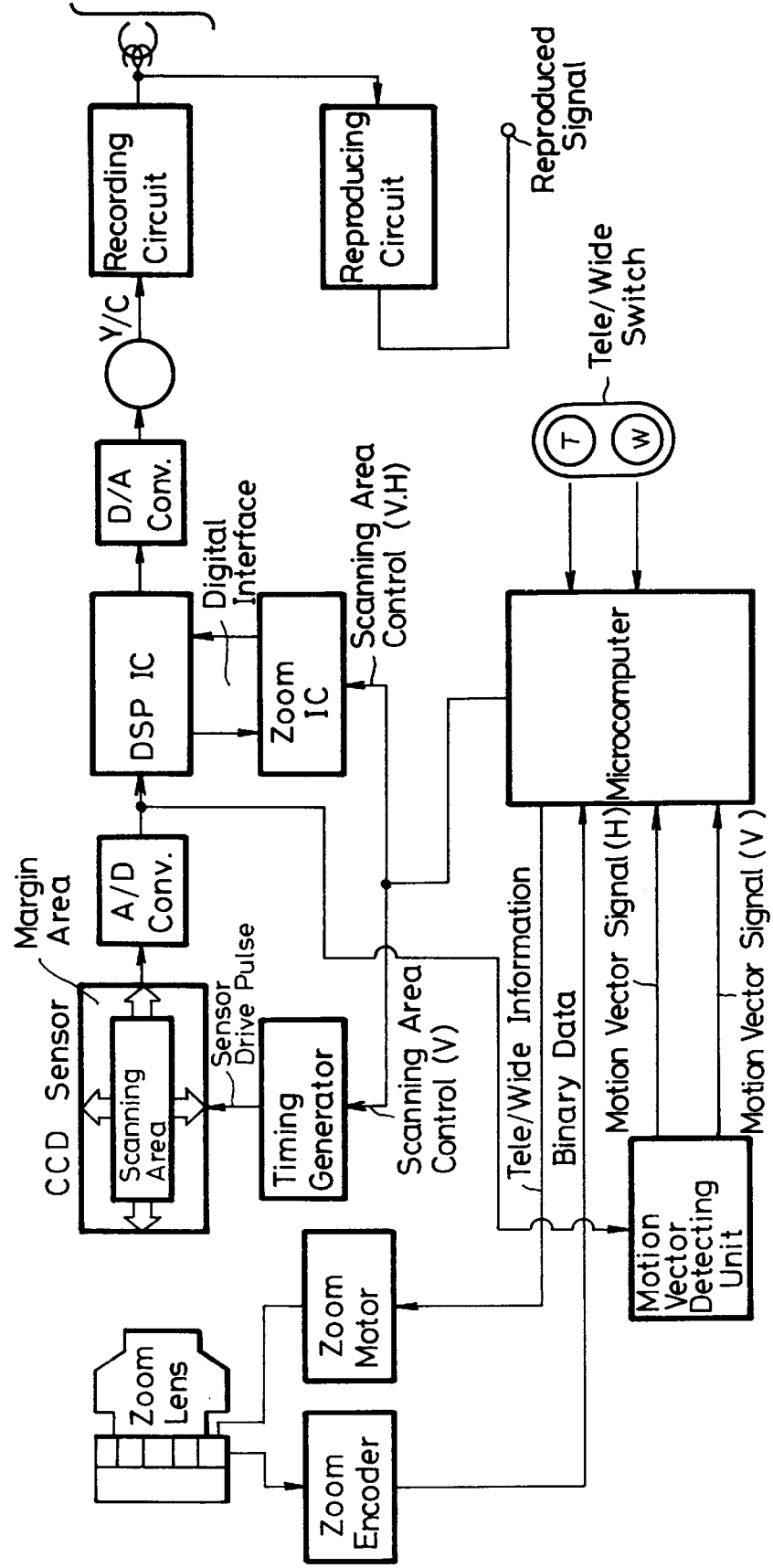
FIG. 1 is a schematic in block diagram form of a video tape recorder with a built-in camera and having a conventional camera shake correction system.
Figure 2:
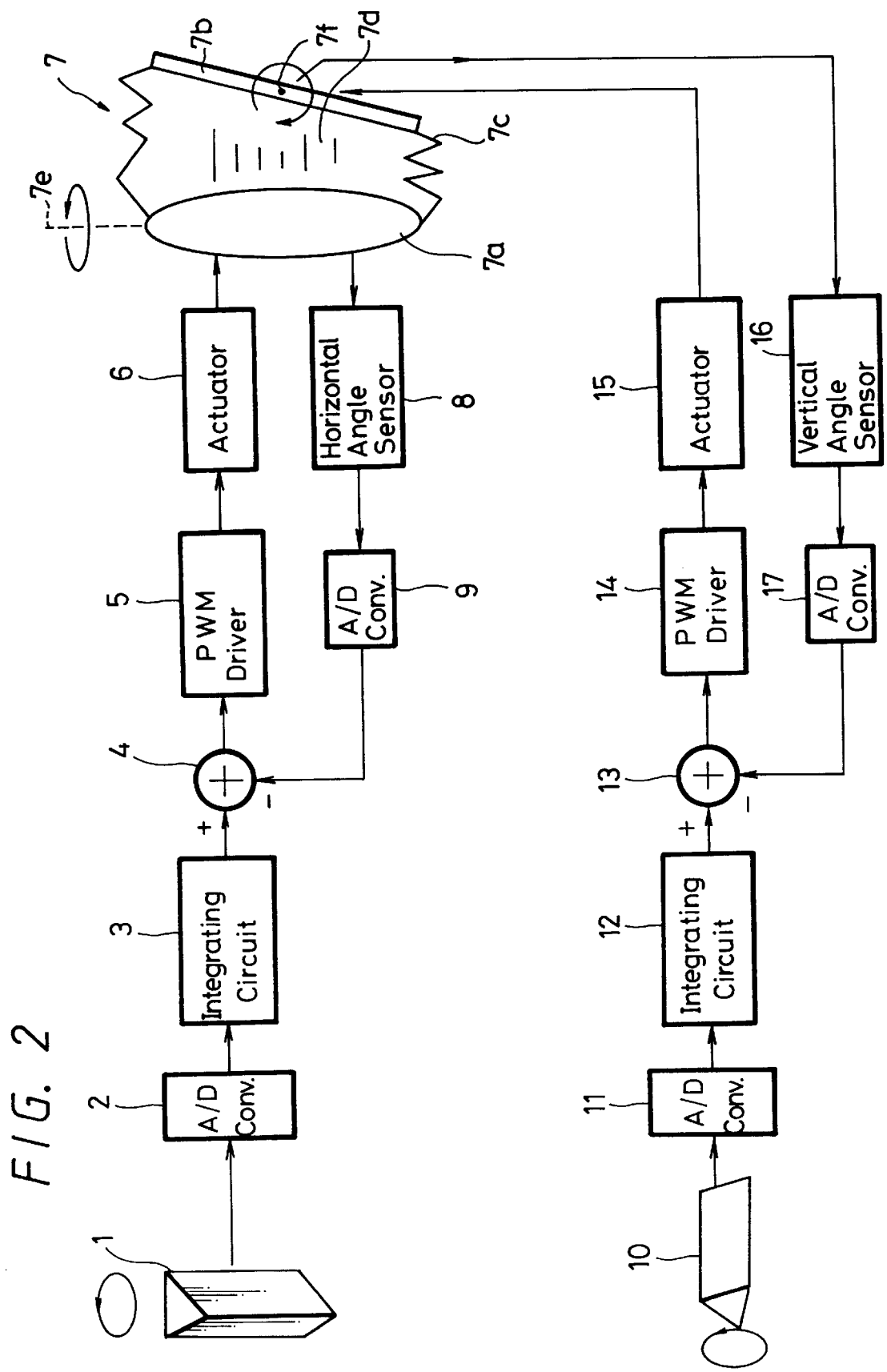
FIG. 2 is a schematic in block diagram form of a circuit arrangement of a camera shake correcting apparatus according to a first embodiment of the present invention.

FIG. 2 shows a camera shake correcting apparatus using the above-described VAP assembly according to a first embodiment of the present invention, in which a horizontal direction angular velocity sensor detects an angular velocity with which the video camera is moving in the horizontal direction due to the camera shake. An angular velocity sensor 1 may be comprised of a piezoelectric vibratory gyro, for example, and a detected signal from the angular velocity sensor 1 is supplied through an analog-to-digital (A/D) converter 2 to an integrating circuit 3. The integrating circuit 3 performs integration processing such as the addition of a preceding detected signal from the angular velocity sensor 1 to a present signal attenuated by a predetermined gain or the like. An integrated output from the integrating circuit 3 is supplied to an adding circuit 4 and the output from the adding circuit 4 is supplied to a pulse width modulation (PWM) driver 5, in which it is processed as a PWM signal and fed to an actuator 6. The actuator 6 actuates a prism assembly 7 in the horizontal direction.

The prism assembly 7 forms the variable angular prism (VAP) that comprises two circular glass plates 7a, 7b bonded by a cylindrical transparent spring portion 7c of bellows-like configuration whose diameter is substantially the same as the diameters of the two glass plates 7a, 7b. A viscous transparent liquid fills the spring portion 7c. A vertical axis or shaft 7e is connected to the glass plate 7a of the prism assembly 7 and is driven to rotate by the actuator 6 so that the prism assembly 7 provides a change of refraction angle in the horizontal direction. A horizontal axis or shaft 7f is connected to the plate glass 7b of the prism assembly 7 and is driven to rotate by another actuator 15 so that the prism assembly 7 provides a change in refraction angle in the vertical direction. Therefore, the glass plate 7a is rotated in the horizontal direction around the vertical axis 7e and 7b is rotated in the vertical direction around the horizontal axis 7F.

A position, that is, the rotational angle of the prism assembly 7 in the horizontal direction, of the glass plate 7a rotated by the actuator 6 in the horizontal direction is detected by a horizontal angle sensor 8 serving as a position detecting means. A detected signal from horizontal angle sensor 8 is supplied through an analog-to-digital (A/D) converter 9 to the minus input of the adding circuit 4. Accordingly, the adding circuit 4 subtracts from the integrated output of the integrating circuit 3 the detected signal representing the rotational angle of the prism 7 in the horizontal direction. A subtracted output of the adding circuit 4 is supplied to the PWM driver 5.

A second angular velocity sensor 10 detects an angular velocity in response to a motion of the video camera when the video camera is moved in the vertical direction as a result of the camera shaking. The angular velocity sensor 10 may also be comprised of a piezoelectric vibratory gyro. A detected signal from the angular velocity sensor 10 is supplied through an analog-to-digital (A/D) converter 11 to an integrating circuit 12 that integrates the detected signal supplied thereto with a preceding detected signal, for example, to thereby provide an integrated output. The integrated output from the integrating circuit 12 is supplied to the plus input of an adding circuit 13. An output from the adding circuit 13 is supplied to a pulse width modulation (PWM) driver 14, in which it is processed as a PWM signal and then fed to an actuator 15.

The actuator 15 is coupled to the horizontal axis or shaft 7f of the glass plate 7b of the prism assembly 7 to rotate the plate glass 7b and change the refraction angle in the vertical direction. A position, that is, the rotational angle of the prism assembly 7 in the vertical direction, at which the glass plate 7b is rotated by the actuator 15 is detected by a vertical angle sensor 16 serving as a position detecting means. A detected signal from the vertical angle sensor 16 is supplied through an analog-to-digital (A/D) converter 17 to the minus input of the adding circuit 13. Therefore, the adding circuit 13 subtracts from the integrated output of the integrating circuit 12 the detected signal representative of the rotational angle of the prism 7 in the vertical direction. The subtracted output is supplied to the PWM driver 14 for driving the actuator 15.

More specifically, the angular velocities of the movements in the horizontal and vertical directions that are generated when camera shaking occurs are detected. The two actuators 6 and 15 rotate the glass plates 7a, 7b of the prism assembly 7 in the horizontal and vertical directions, respectively, based on the detected angular velocities to change the refraction angle of the focused light, so that the light is prevented from moving on the target screen of the CCD element (not shown) disposed at the rear stage of the prism assembly 7. The positions of the prism assembly 7, that is, the rotational angles in the horizontal and vertical directions, are respectively detected and then fed back to the actuators 6 and 15.

Figure 3:
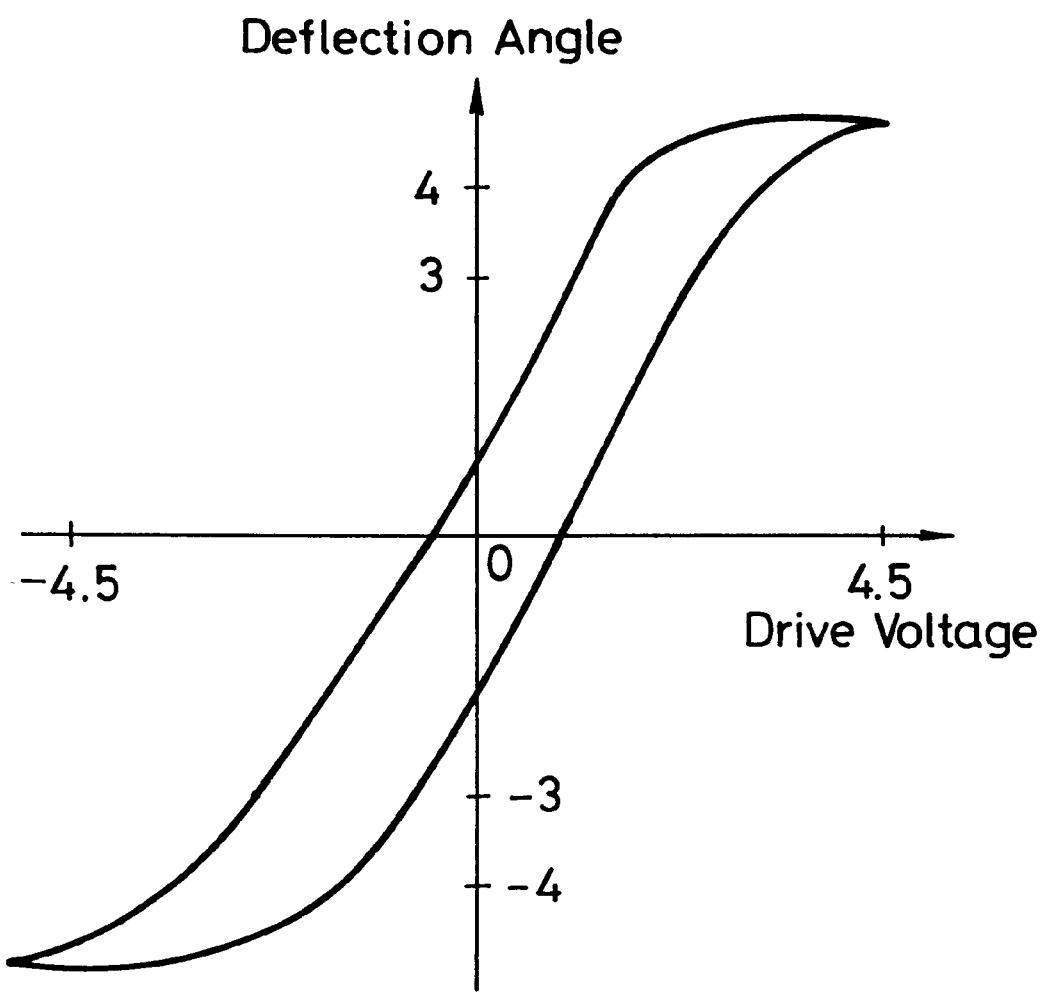
FIG. 3 is a graph used to explain the operation of the camera shake correcting apparatus according to the circuit of FIG. 2.

FIG. 3 shows a driving curve of the prism assembly 7 wherein the ordinate axis represents a deflection angle (e) and the abscissa axis represents a drive voltage (V). As shown in FIG. 3, a relationship between the deflection angle and the drive voltage of the prism 7 has a hysteresic characteristic.

Figure 4:
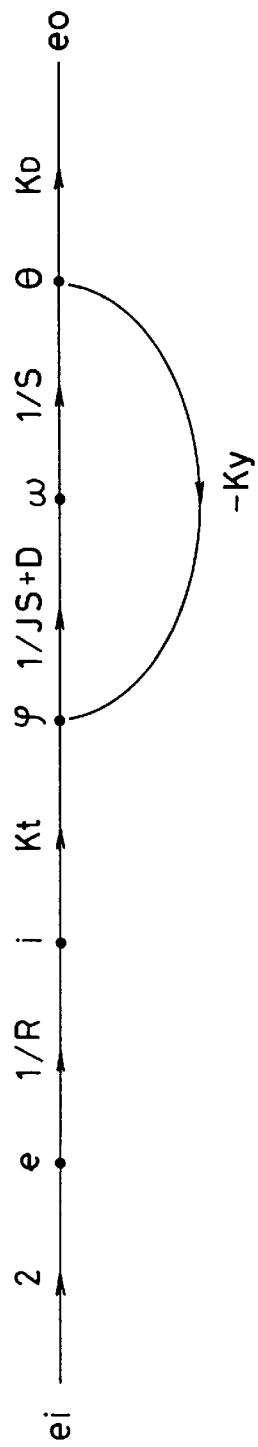
FIG. 4 is a signal flow diagram used to explain the operation of the camera shake correcting apparatus according to the circuit of FIG. 2.

FIG. 4 shows a signal flow diagram of the camera shake correcting system of FIG. 2, in which reference symbol R stands for a winding resistance (V/A) of the actuator 6 or 15, $K_t$ represents a torque constant (700 g·cm/A), J represents inertia (g·cm/sec$\lambda$), D represents a viscosity resistance (g·cm/sec) of the liquid contained in the prism assembly 7, Ky represents a spring constant (g·cm/deg) of the spring portion 7c and ei an alternating drive voltage (V).

The open loop gain in this case can be expressed by equation (1) below:

$$G_{open}(S) = \frac{2K_tK\theta}{R} \cdot \frac{1}{JS^2 + DS + K_y} \quad (1)$$

Expressing the equation (1) by a retarded general expression of second order yields the following equation (2):

$$G(j\omega) = \frac{K}{1 - \left(\frac{\omega}{\omega_n}\right)^2 + j2\zeta\left(\frac{\omega}{\omega_n}\right)} \quad (2)$$

where n represents a normalization and $\zeta$ represents an attenuation coefficient.

Figure 5:
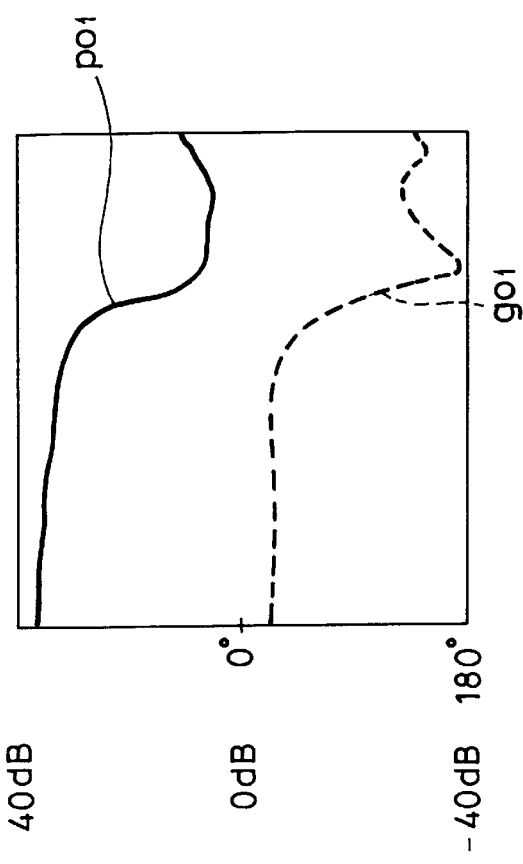
FIG. 5 is a graph used to explain the operation of the camera shake correcting apparatus according to the circuit of FIG. 2.

The phase and gain in the open loop construction represented in FIG. 4 are illustrated in FIG. 5 that shows a phase curve $po_1$ and a gain curve $go_1$ and wherein the ordinate axis represents phase (degrees) and gain (dB) and the abscissa axis represents frequency (Hz).

Figure 6A:
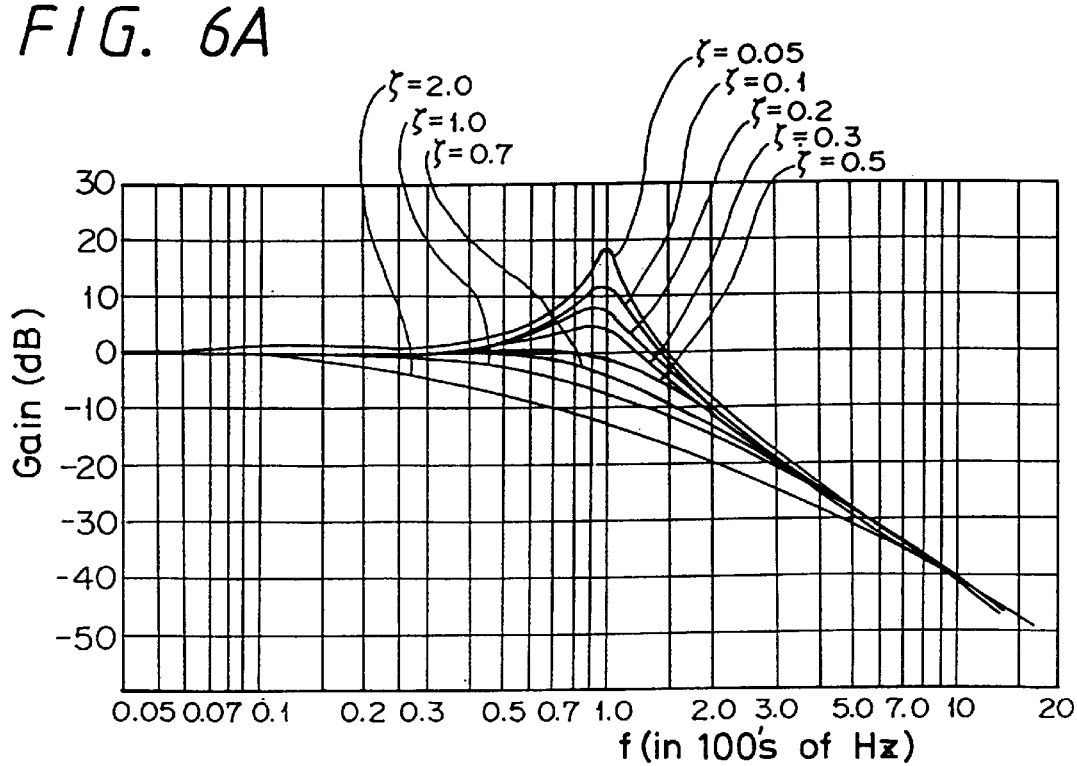
FIGS. 6A and 6B are graphs used to explain the operation of the camera shake correcting apparatus according to the circuit of FIG. 2.
Figure 6B:
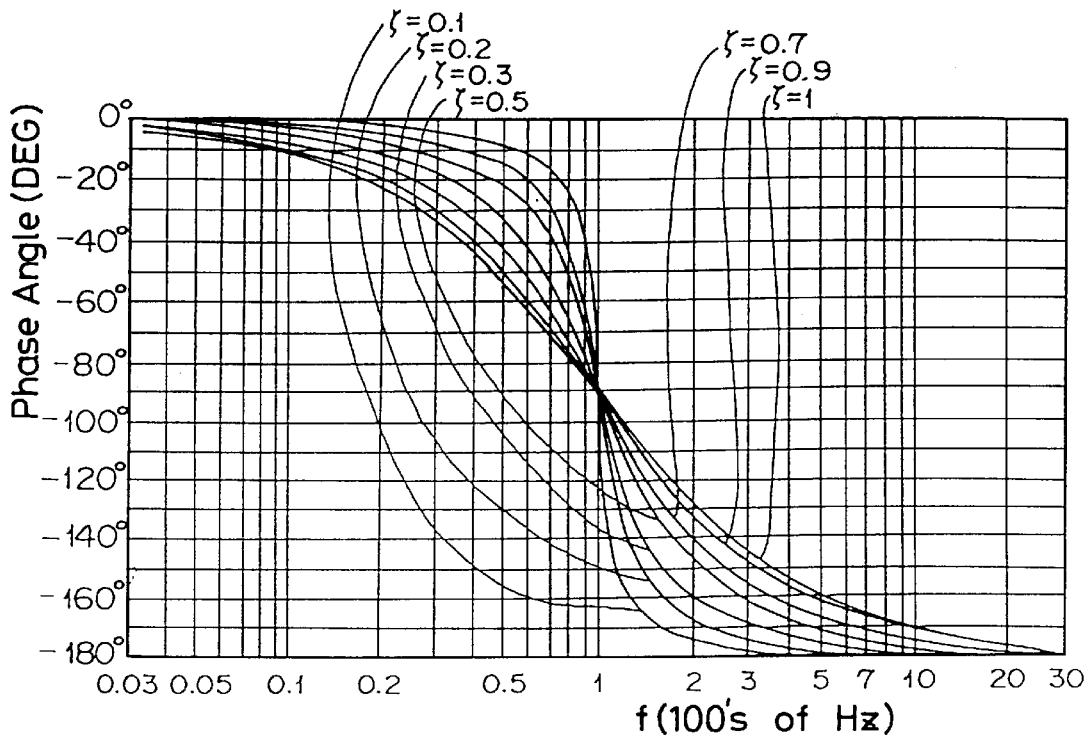

FIGS. 6A and 6B are Bode diagrams showing system characteristics in which K is normalized to 1 (K=1). FIG. 6A shows gain characteristics plotted against frequency and FIG. 6B shows the phase characteristics plotted against frequency. FIG. 6A shows gain characteristics when the attenuation coefficient is 0.05, 0.1, 0.2, 0.3, 0.5, 0.7, 1.0 and 2.0. FIG. 6B shows phase characteristics when the attenuation coefficient is 0.1, 0.2, 0.3, 0.5, 0.7, 0.9 and 1.0.

As shown in FIGS. 6A and 6B, when the attenuation coefficient is 0.7, the phase and gain characteristics are satisfactorily matched with the frequencies. Further, although the phase and gain characteristics are disturbed by resonance characteristics appearing near 100 Hz, they are satisfactorily matched at frequencies of 50 Hz or below.

Figure 7:
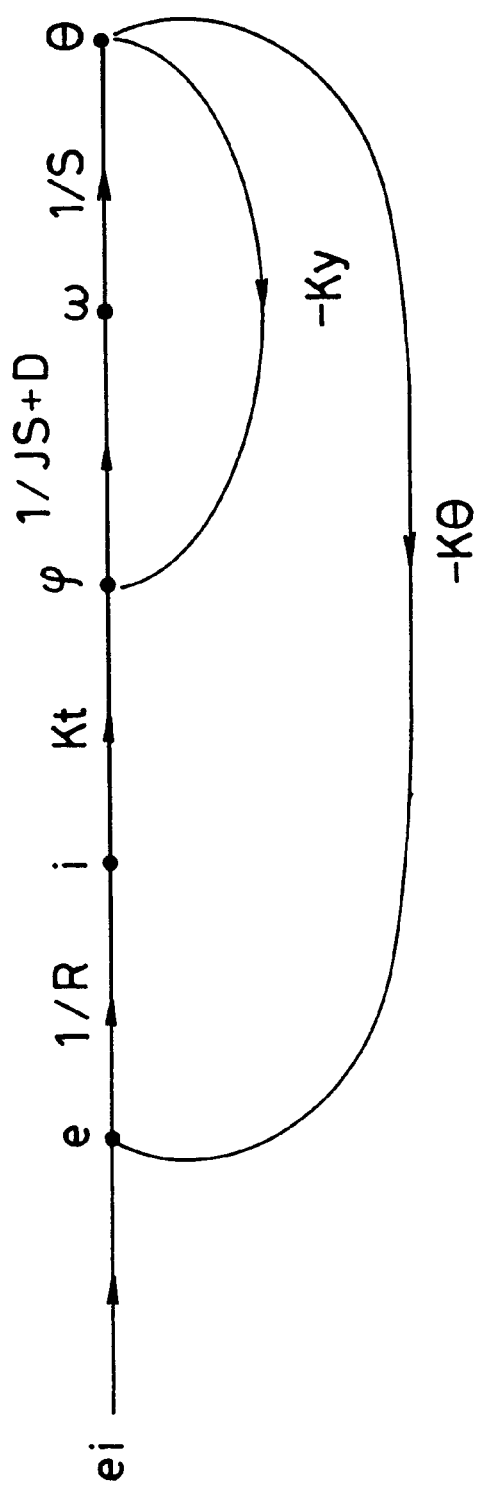
FIG. 7 is a signal flow diagram used to explain the operation of the camera shake correcting apparatus according to the circuit of FIG. 2.

FIG. 7 is a signal flow diagram showing the signal flow when a closed loop is formed of the PWM drivers 5, 14, the actuators 6, 15 and the angle sensors 8, 16 and where the integrated results from the integrating circuits 3 and 12 are assumed to be reference values depending on the open loop characteristic of the above-described camera shake correcting apparatus.

The gain in this closed loop can be expressed by the following equation (3):

$$G_{close}(S) = \frac{G_o/K\theta}{1+G_o} \quad (3)$$

$$= \frac{1}{\frac{K\theta}{G_o} + K\theta}$$

$$= \frac{1}{\frac{R}{2K_t}(JS^2 + DS + K_y) + K\theta}$$

$$= \frac{1}{\frac{RJ}{2K_t}S^2 + \frac{RD}{2K_t}S + \left(\frac{RK_y}{2K_t} + K\theta\right)}$$

FIGS. 8A and 8B are graphs showing measured results of the gain in the closed loop. FIG. 8A shows the change of gain relative to the input level, wherein the ordinate axis represents the gain (dB) and the abscissa axis represents the frequency (Hz). FIG. 8B shows the change in phase relative to the input level, wherein the ordinate axis represents the phase (degree) and the abscissa axis represents the frequency (Hz).

In the graphs of FIGS. 8A and 8B, a characteristic curve go2 represents a measured gain when the input level falls within a range of ±200 mV, a characteristic curve go3 represents a measured gain when the input level falls within a range of ±50 mV, a characteristic curve go4 represents a measured gain when the input level falls within a range of ±25 mV, a characteristic curve go5 represents a measured gain when the input level falls within a range of ±10 mV, a characteristic curve po2 represents a measured phase when the input level falls within a range of ±200 mV, a characteristic curve po3 represents a measured phase when the input level falls within a range of ±50 mV, a characteristic curve po4 represents a measured phase when the input level falls within a range of ±25 mV, and a characteristic curve po5 represents a measured phase when the input level falls within a range of ±10 mV.

Study of the graphs shown in FIGS. 8A, 8B reveals that the gain and the phase also are changed relative to the input level in the closed loop characteristic similar to the changes found in the open loop characteristic.

The above-described camera shake correcting apparatus is not free from some disadvantages, however. As is clear from equation (1), the input and output characteristics of the prism assembly 7 are made nonlinear due to the viscosity resistance D and the spring constant Ky of the prism assembly 7, in particular, the gain is decreased for a very small signal. There is then the disadvantage that a small camera shake cannot be suppressed. As is clear from the graph of FIG. 3 showing the relationship between the drive voltage of the prism assembly 7 and the deflection angle, such relationship includes the hysteresis characteristic. There is then the disadvantage that the prism assembly 7 cannot be moved exactly as it is instructed by the circuit. Further, as is clear from the graphs of FIGS. 6A and 6B showing the gain and phase characteristics, a resonance characteristic appears at a frequency near 100 Hz, thereby causing a frequency disturbance.

The above-described characteristics are determined depending on the inertia J, the viscosity resistance D, and the spring constant Ky of the prism assembly 7. Therefore, the only way of improving these characteristics is to improve the prism assembly 7 mechanical arrangement.

As is clear from the graphs of FIG. 5 and FIGS. 8A, 8B, there are some disadvantages in that the gain of the low band component does not become 0 dB and hence the frequency position becomes unstable, that is, there is no phase margin at 0 dB so that an oscillation tends to occur. The gain of the low band component depends on the signal level and oscillation tends to occur at the frequency near 100 Hz due to the fluctuation of the peak level. This is also true in FIGS. 6A and 6B. Moreover, temperature dependency is large.

The bellows-like spring portion 7c is formed by folding a material whose strength is affected by temperature. Hence, the spring constant thereof changes with temperature. Also, the viscosity of the liquid 7d contained in the spring portion 7c changes with temperature. In addition, the input and output transfer function of the prism assembly 7 is of the second order or higher, because of the spring term, the friction term, and the like. There is then the disadvantage such that the oscillation margin is reduced when the feedback servo is effected.

According to a second embodiment of the present invention, a camera shake correcting apparatus is provided that can remove the above-described disadvantages and in which certain characteristics are improved.

As shown in FIGS. 9 through 23, the camera shake correcting apparatus according to a second embodiment of the present invention comprises the variable angular prism assembly 7, the drivers 6, 15 for driving the variable angular prism assembly 7, the position detectors 8, 16 and 20 for detecting the positions of the variable angular prism 7, and the camera velocity detecting system 1, 10, 26, 32 and 20 for detecting velocity representing the shaking of the camera. The driving means 6, 15, 20 drive the variable angular prism assembly 7 in response to detected results of the position detecting means 8, 16, 20 and the velocity detecting means 1, 10, 26, 32 and 20.

According to the second embodiment of the present invention, because the variable angular prism assembly 7 is driven in response to the detected results from the position detecting means 8, 16, 20 and the velocity detecting means 1, 10, 26, 32 and 20, the nonlinearity of the variable angular prism 7 can be alleviated and the variable angular prism assembly 7 can be driven smoothly. Therefore, the phase margin that is part of the servo characteristic can be increased, so that variations in values and dimensions that occur in mass production manufacturing operations are rendered less critical. The camera shake correcting apparatus of the present invention can also be provided with improved temperature characteristics.

Figure 9:
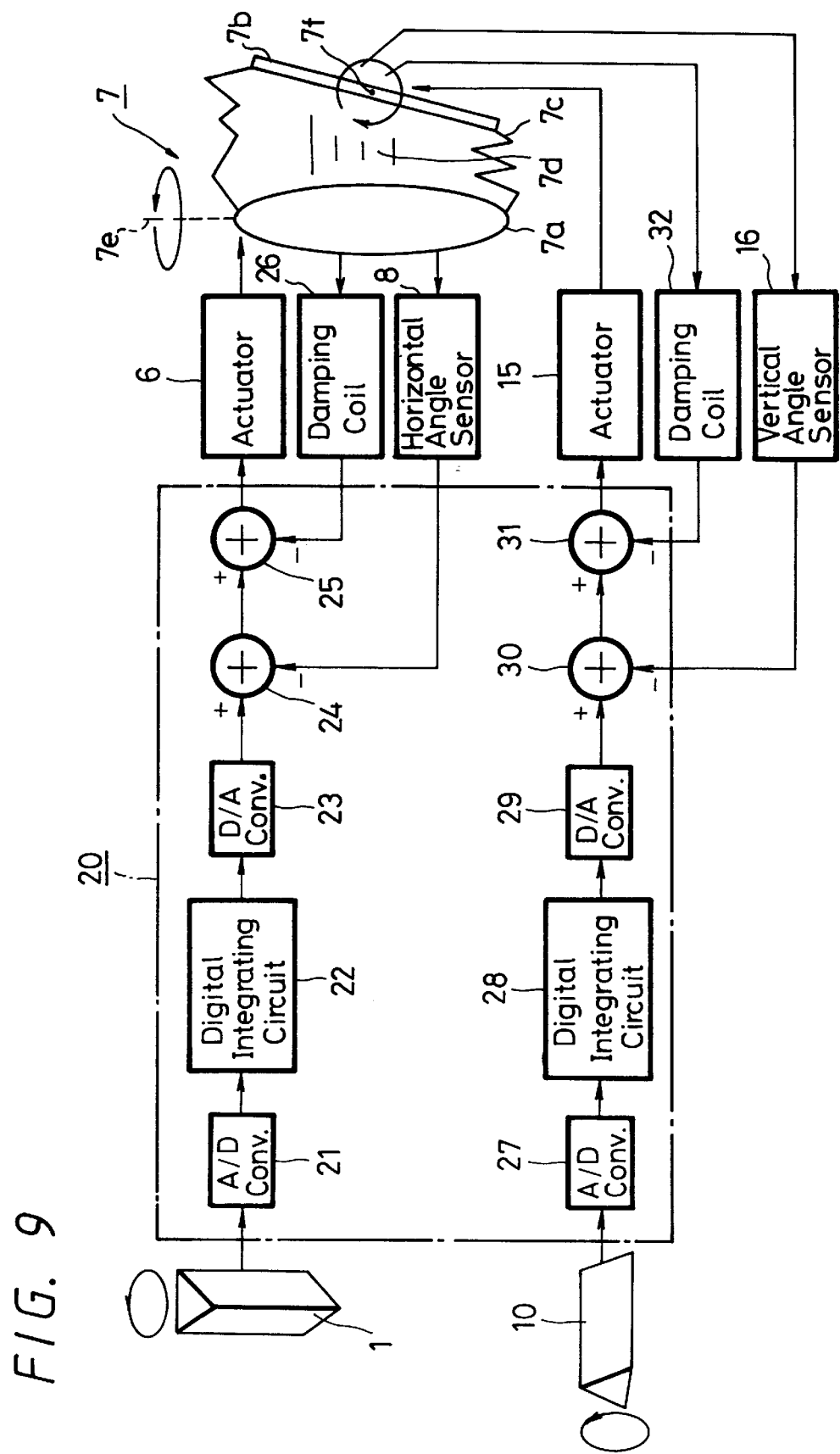
FIG. 9 is a schematic in block diagram form of a circuit arrangement of a camera shake correcting apparatus according to a second embodiment of the present invention.

In FIG. 9, like parts corresponding to those of FIG. 2 are marked with the same reference numerals and need not be described in detail. As shown in FIG. 9, the detected signal from the angular velocity sensor, that is, the horizontal direction angular velocity sensor 1, is supplied through an analog-to-digital (A/D) converter 21 to a digital integrating circuit 22. The angular velocity sensor 1 detects what is known as the yaw angle, for example. The digital integrating circuit, 22 effects the integration by adding the digital detected signal from the A/D converter 21 with an attenuated preceding detected signal. An integrated output from the digital integrating circuit 22 is converted into an analog signal by a digital-to-analog (D/A) converter 23 and then fed to the plus input of an adding circuit 24.

The adding circuit 24 subtracts from the detected signal of the D/A converter 23 a position signal that is obtained when the horizontal angle sensor 8, which is known as a potentio/integral/differential sensor (PID), detects the position of the variable angular prism (VAP) assembly 7 in the horizontal direction. An output of the adding circuit 24 is supplied to an adding circuit 25 in the next stage.

The adding circuit 25 subtracts a signal from a damping coil 26 from the output of the adding circuit 24. The resultant difference signal is supplied to the actuator 6 as a drive signal, whereby the prism assembly 7 is moved in the horizontal direction.

The detected signal from the angular velocity sensor, that is, the vertical direction angular velocity sensor 10, is supplied through an analog-to-digital (A/D) converter 27 to a digital integrating circuit 28. The angular velocity sensor 10 detects what is known as the pitch angle, for example.

The digital integrating circuit 28 effects the integration by adding the digital detected signal from the A/D converter 27 to the attenuated preceding detected signal as described above. An integrated output from the digital integrating circuit 28 is converted into an analog signal by a digital-to-analog (D/A) converter 29 and then fed to the plus input of an adding circuit 30. The adding circuit 30 subtracts from the detected signal of the D/A converter 29 a position signal that is obtained when the vertical angle sensor, that is, a PID sensor 16, detects the position of the variable angular prism (VAP) assembly 7 in the vertical direction. The difference output of the adding circuit 30 is connected to the plus input of an adding circuit 31 in the next stage. The adding circuit 31 subtracts a signal from a damping coil 32 from the output from the adding circuit 30. A resultant difference signal is supplied to the actuator 15 as the drive signal, whereby the prism assembly 7 is moved in the vertical direction.

As described above, according to the camera shake correcting apparatus of the first embodiment of the present invention, by using only the horizontal and vertical angle sensors 8 and 16 it is not possible to suppress a variety of disadvantages caused by the viscosity of the liquid 7d in the prism assembly 7, the spring resistance of the spring portion 7c, fluctuations caused by various factors such as axial friction or the like, temperature dependency characteristics, and so on.

In order to suppress these various disadvantages that arise using only the horizontal and vertical angle sensors 8 and 16, it is proposed to form a so-called D loop such that the output e0, shown in FIG. 4, is differentiated and fed back to obtain the phase margin. The D loop cannot be utilized in this case because the signal-to-noise (S/N) ratio of the angle sensors 8, 16 is poor in the high band, in particular. Furthermore, if a D loop gain is increased in order to obtain a DC gain, then an oscillation margin is lost. Also, although the integrating loop (I) is effective for increasing the DC gain, the integrating loop becomes useless unless the D loop is utilized together therewith because the integrating loop when used alone deteriorates the phase margin.

According to the second embodiment of the present invention, instead of the differential D loop, a velocity loop is used, that is, a feedback loop using the damping coils 26 and 32.

Figure 10:
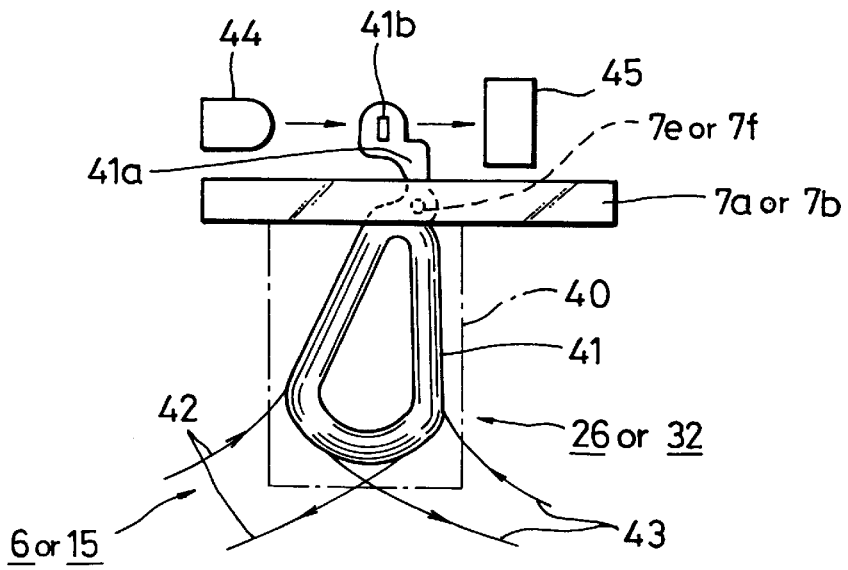
FIG. 10 is an elevational view showing the construction of a main portion of the camera shake correcting apparatus of the system of FIG. 9 in more detail.
Figure 11:
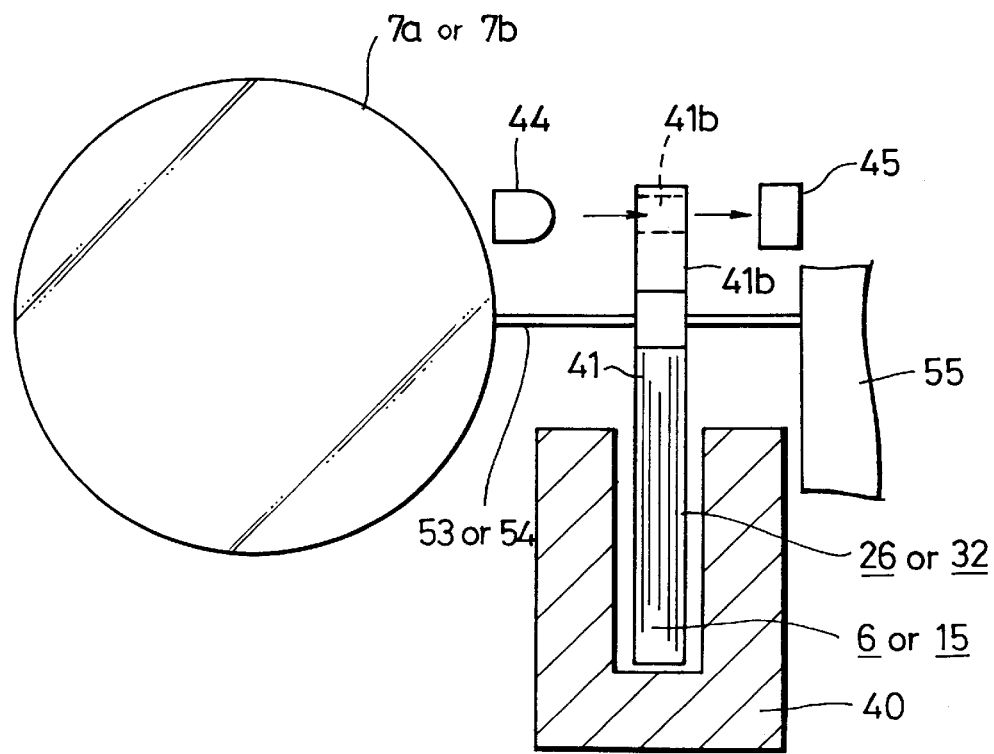
FIG. 11 is an elevational view in partial cross section of the main portion of the camera shake correcting apparatus shown in FIG. 10.

FIGS. 10 and 11 show the glass plate 7a or 7b of the prism assembly 7, the actuator 6 or 15, the damping coil 26 or 32, and a stator 40 or the like. A bobbin 41 is provided that has an axial hole formed at a position slightly above the intermediate portion thereof for accepting the vertical axis or shaft 7e or the horizontal axis or shaft 7f. A detecting portion 41a is formed above this axial hole and a slot 41b is formed through the top portion of the detecting portion 41a of the bobbin 41.

On the left of the detecting portion 41a as seen in FIG. 10, and also at the so-called prism center, a photo-diode 44 is arranged so that the optical axis thereof passes through the slot 41b. On the right of the slot 41b and also at the so-called prism center, a photo-sensor 45 is arranged to receive light emitted from the photo-diode 44. Thus, the position at which the light emitted from the photo-diode 44 is focused on the photo-sensor 45 is moved when the bobbin 41 is rotated by the actuators 6, 15.

Around the lower portion of the bobbin 41, there are wound drive coil or actuator wires 42 and damping coil wires 43 in parallel to each other. The bobbin 41 having the drive coil wires 42 and the damping coil wires 43 wound therearound is disposed within a stator 40.

As shown in FIG. 11. A horizontal axis rod 53 or vertical axis rod 54 is attached to the horizontal axis 7e or vertical axis 7f of the bobbin 41. One end of the rod 53 or 54 is attached to the glass plate 7a or 7b of the prism assembly 7 and the other end thereof is attached to the inner wall portion of a housing 55 of the shake correcting system.

Figure 12:
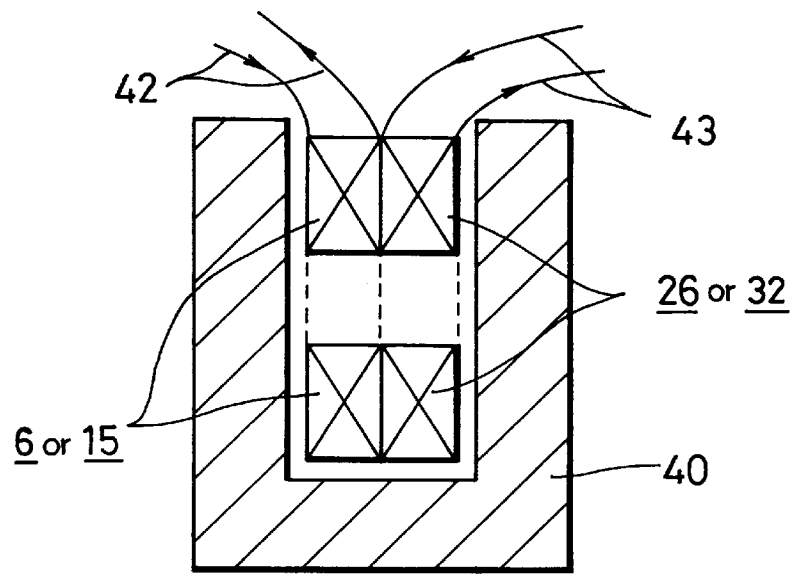
FIG. 12 is a cross-sectional view showing the main portion of the camera shake correcting apparatus of FIG. 10 in more detail.

FIG. 12 shows the manner in which the drive coil wires 42 and the damping coil wires 43 are wound around the bobbin 41 and, more specifically, the drive coil wires 42 are wound around the left portion of the bobbin 41, not shown in FIG. 12, to construct the actuator 6 or 15 and the damping coil wires 43 are wound around the right portion of the bobbin 41 to construct the damping coil 26 or 32.

Figure 13:
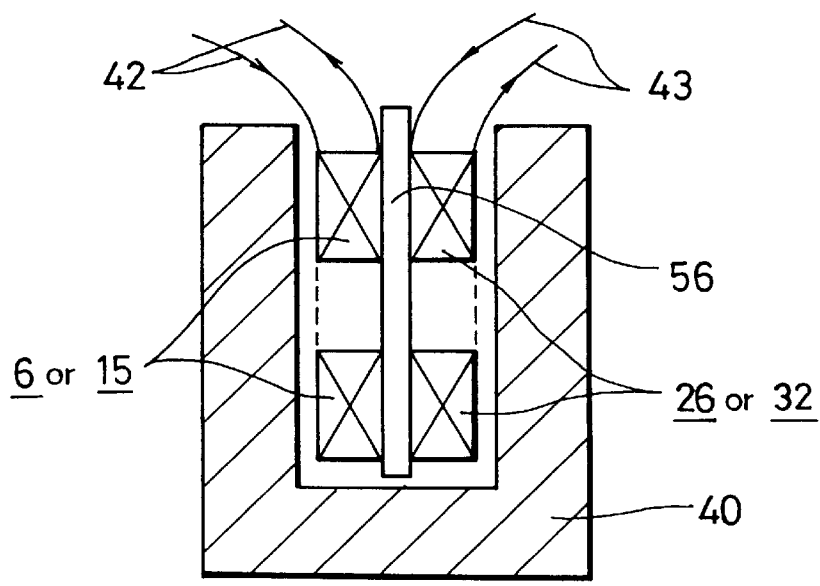
FIG. 13 is a cross-sectional view showing the main portion of the camera shake correcting apparatus of FIG. 10 in more detail.

FIG. 13 shows another embodiment of the structure of FIGS. 10 through 12, in which a spacer 56 is disposed at substantially a central portion of the bobbin 41, not shown in FIG. 13. The drive coil wires 42 for actuator 6 or 15 are wound around the bobbin 41 on the left side of the spacer 56. Also, the damping coil wires 43 for the damping coil 26 to 32 are wound around the bobbin 41 on the right side of the spacer 56.

According to the embodiment of FIG. 13, high-frequency crosstalk between the actuator coil and the damping coil can be prevented. Hence, the operating characteristics of the system can be unaffected by crosstalk.

Although in the embodiment described above there is provided a single bobbin 41, the present invention is not limited to a single bobbin and two bobbins may be attached to the left and right sides of the spacer 56, for example.

Figure 14:
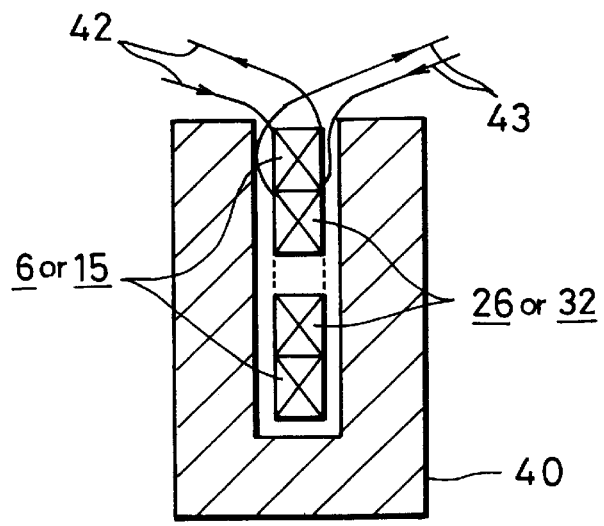
FIG. 14 is a cross-sectional view showing the main portion of the camera shake correcting apparatus of FIG. 10 in more detail.

FIG. 14 shows a further embodiment of the structure of the coils shown in FIGS. 12 and 13, in which damping coil wires 43 are wound around the bobbin 41, not shown in FIG. 14, to construct the damping coil 26 or 32. Further, drive coil wires 42 are wound around the damping coil wires 43 to construct the actuator 6 or 15. With this arrangement, the whole thickness of the coil is reduced and the torque of the motor is increased, because the spacing of the stator is increased with the increase of the thickness of the coil, resulting in the torque of the motor being increased.

The bobbin 41 is rotated in response to a current flowing through the drive coil, that is, through actuator 6 or 15, or the glass plate 7a or 7b being rotated so that the damping coil 26 or 32 generates a voltage proportional to the rotational angular velocity, that is, E dθ/dt d/dt (magnetic flux).

Figure 15:
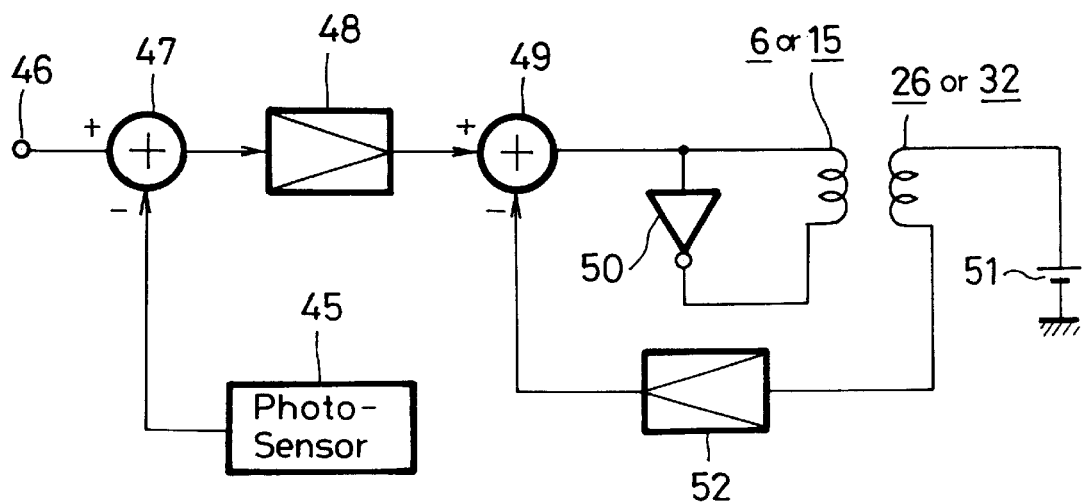
FIG. 15 is a schematic in block diagram of a portion of the camera shake correcting apparatus shown in FIG. 9.

FIG. 15 shows in block diagram form a main portion of the camera shake correcting apparatus in detail, in which an instruction signal or detected signal from the system shown within the broken line 20 in FIG. 9, which may comprise a microcomputer, is fed to an input terminal 46 and connected to the plus input of an adding circuit 47. The adding circuit 47 subtracts the detected signal produced by the photo-sensor 45 of FIG. 10 from the instruction signal, and the difference signal is supplied through an amplifying circuit 48 to the plus input of another adding circuit 49. The adding circuit 49 subtracts from this signal the voltage proportional to the rotational angular velocity supplied thereto from the damping coil 26 or 32 through an amplifying circuit 52. This difference signal is supplied to the actuator 6 or 15 and to an inverting circuit 50.

The drive signal from the adding circuit 49 is supplied to one end of the actuator 6 or 15 and the signal from the inverting circuit 50 is supplied to the other end of the actuator 6 or 15, whereby a current flows through the actuator 6 or 15 to generate a magnetic flux to rotate the bobbin 41 and, thus, to rotate the glass plate 7a or 7b.

Figure 16:
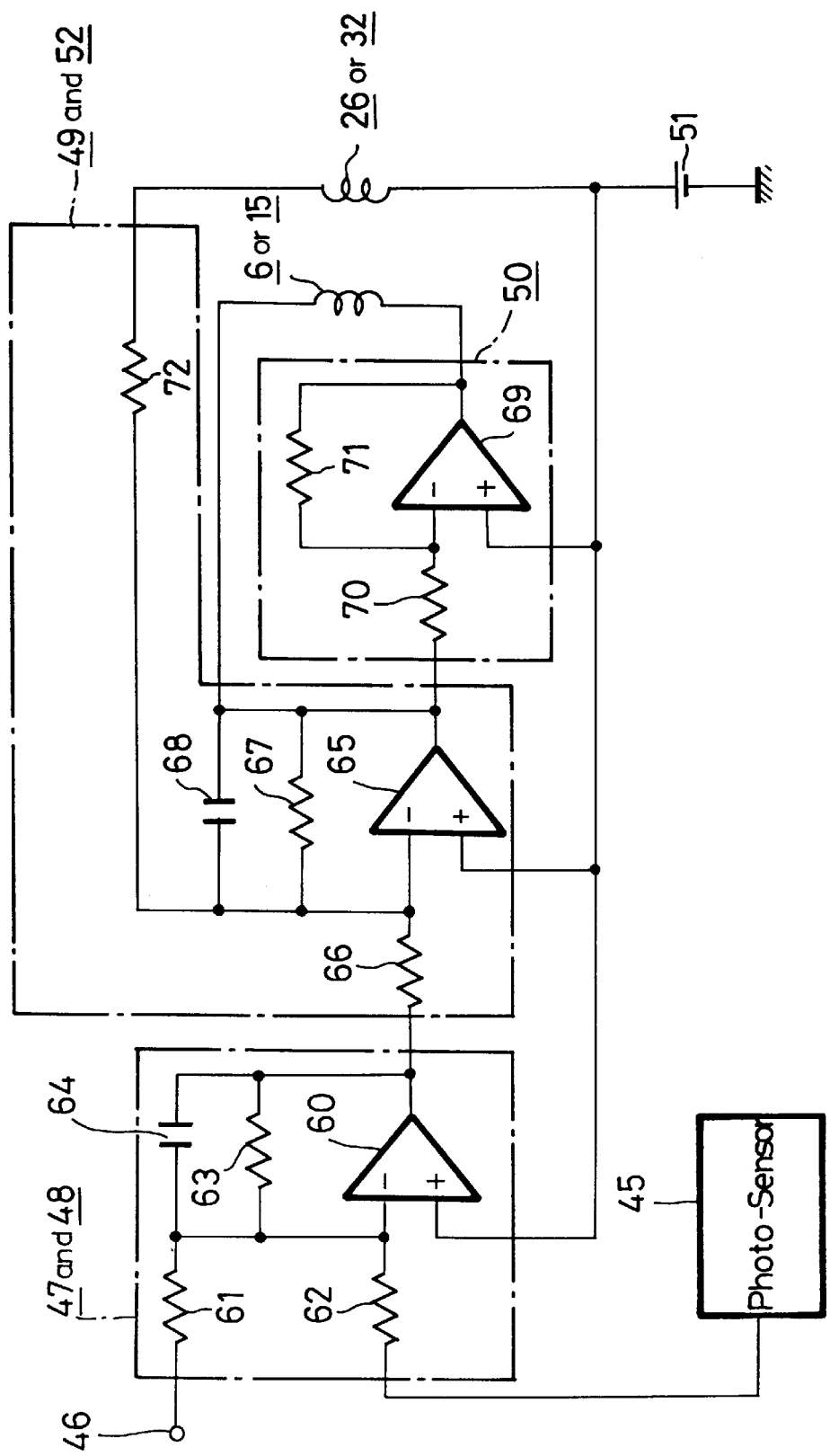
FIG. 16 is a schematic diagram of a portion of the camera shake correcting apparatus shown in FIG. 9.

The embodiment of FIG. 15 is shown in more detail in FIG. 16, in which the output of the photo-sensor 45 is connected through a resistor 62 to an inverting input terminal (−) of an operational amplifier circuit 60. The inverting input terminal (−) of the operational amplifier circuit 60 and the output terminal of the operational amplifier circuit 60 are connected together via a parallel circuit of a resistor 63 and a capacitor 64. The inverting input terminal (−) of the operational amplifier circuit 60 is connected to the input terminal 46 through a resistor 61. A non-inverting input (+) of the operational amplifier circuit 60 is connected to a positive side of the power supply 51. Thus, the adding circuit 47 and the amplifying circuit 48 are formed by the elements within the one-dot chain line. The output of the operational amplifier circuit 60, that is, the output of the amplifying circuit 48 is connected through a resistor 66 to an inverting input (−) of another operational amplifier circuit 65. The inverting input (−) of the operational amplifier circuit 65 and the output of the operational amplifier circuit 65 are connected together by a parallel circuit of a resistor 67 and a capacitor 68. The inverting input (−) of the operational amplifier circuit 65 is connected through a resistor 72 and the damping coil 26 or 32 to the positive side of the power supply 51. Thus, the adding circuit 49 and the amplifying circuit 52 are formed by the elements shown within the one-dot chain line in FIG. 16. Then, the output of the operational amplifier circuit 65, which is the output of the amplifying circuit 52, is connected through a resistor 70 to an inverting input (−) of a third operational amplifier circuit 69. The output of the second operational amplifier circuit 65 is connected through the actuator 6 or 15 to the output terminal of the third operational amplifier circuit 69. A non-inverting input (+) of the operational amplifier circuit 69 is connected to the positive side of the power supply 51. Thus, the inverting circuit 50 is formed by the elements shown within the one-dot chain line block in FIG. 16. The values of resistors 61, 62 and resistors 66, 72 determine the adding ratios of the adding circuits 47, 49, respectively. The resistors 63, 67 are used to determine the gains of the amplifying circuits 48, 52, respectively. The capacitors 64, 68 form active low-pass filters, respectively, and the resistors 70, 71 are used to determine the gain of the inverting circuit 50.

Figure 17:
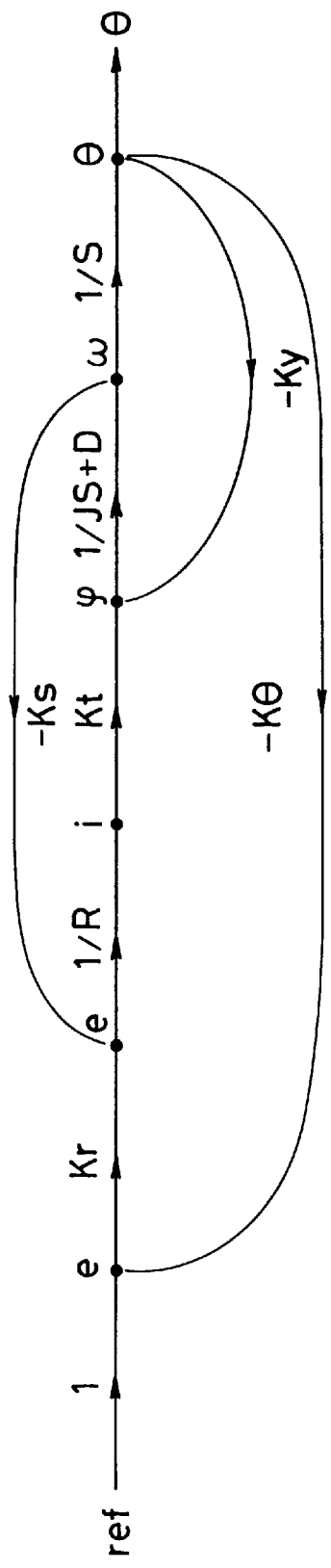
FIG. 17 is a signal flow diagram used to explain the operation of the camera shake correcting apparatus of the system of FIG. 9.

The servo of the prism assembly 7 in the open loop according to this embodiment can be demonstrated in the signal flow diagram of FIG. 17, in which reference symbol R represents a winding resistance (V/A) of the actuator 6 or 15, Kt represents a torque constant (700 g·cm/A), J represents an inertia (g·cm/sec$^2$), D represents a viscosity resistance (g·cm/sec) of the liquid in the prism assembly 7, Kθ represents a detection gain (V/deg) of the angle sensor 8 or 16, Ky represents a spring constant (g·cm/deg) of the spring portion 7c, Kr represents the gains of the adding circuits 24, 25 and the adding circuits 30, 31 or adding circuits 47, 49 in FIG. 15, KP represents a position, that is, an amplifying gain of the photo-sensor 45, and Ks represents a velocity feedback, that is, the gain of the damping coil 26 or 32 or amplifying circuit 52 in FIG. 15.

Figure 18:
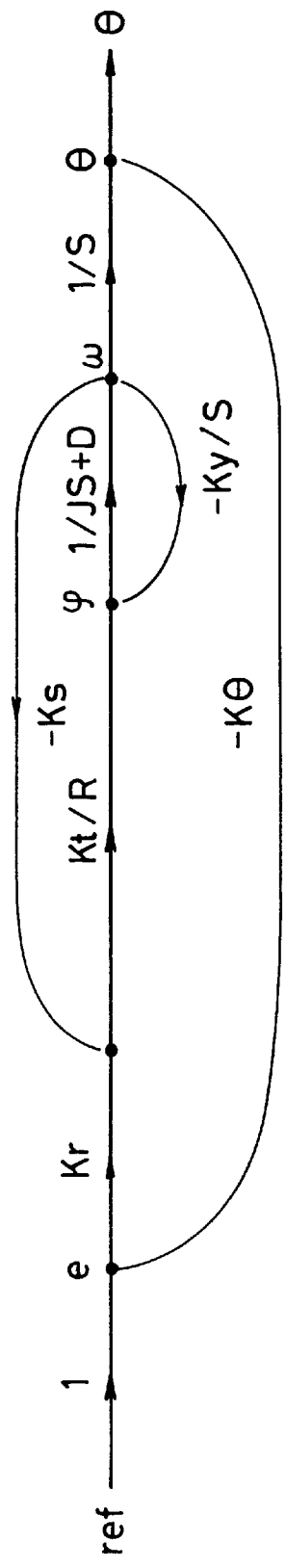
FIG. 18 is a signal flow diagram used to explain the operation of the camera shake correcting apparatus of the system of FIG. 9.

In the signal flow diagram of FIG. 17, the spring constant-Ky can be set to—Ky/S as shown in FIG. 18.

Figure 19:
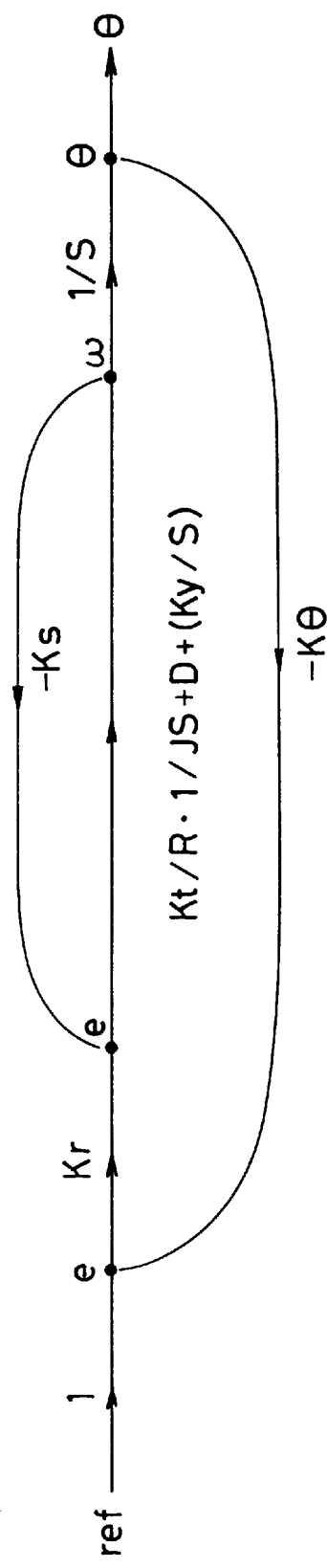
FIG. 19 is a signal flow diagram used to explain the operation of the camera shake correcting apparatus of the system of FIG. 9.
Figure 20:
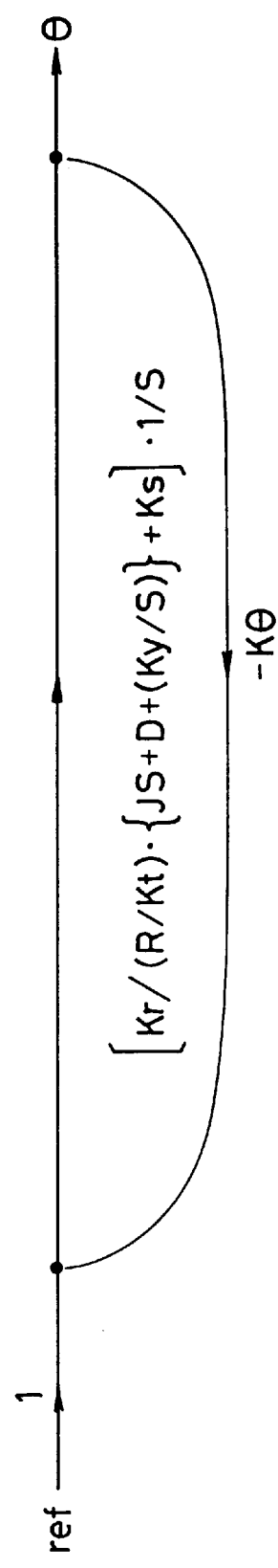
FIG. 20 is a signal flow diagram used to explain the operation of the camera shake correcting apparatus of the system of FIG. 9.

Collecting respective parameters in the velocity feedback gain KS, we have Kt/R·(1/JS+D+(Ky/S)) as shown in FIG. 19. Collecting respective parameters in the detection gain Kθ of the vertical angle sensors 8, 16, we have K$_r$/[((R/K$_t$)·(JS+D+(K$_y$/S))+K$_s$]·1/S as shown in FIG. 20.

Therefore, gain G$_{open(phase)}$ in the open loop can be expressed by equation (4):

$$G_{open(PHASE)} = -\frac{K_r K\theta}{\frac{R}{K_t}\left(JS + D + \frac{K_y}{S}\right) + K_s} \cdot \frac{1}{S} \quad (4)$$

$$= -\frac{K_r K\theta}{\frac{RJ}{K_t}S^2 + \left(\frac{RD}{K_t} + K_s\right)S + \frac{RK_y}{K_t}}$$

Further, when RD/D$_t$<K$_s$ and RK$_y$/K$_t$=0, gain G$_{open(phase)}$ can be expressed by the following equation (5):

$$G_{open(PHASE)} = -\frac{K_r K\theta}{S\left(\frac{RJ}{K_t}S + K_s\right)} \quad (5)$$

$$= -\frac{\frac{K_r K\theta}{K_s}}{S\left(1 + \frac{RJ}{K_t K_s}S\right)}$$

Figure 21:
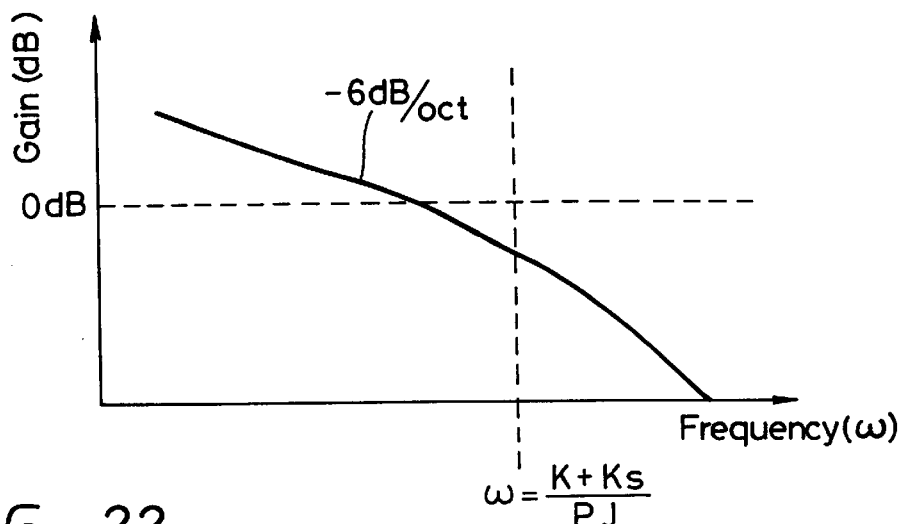
FIG. 21 is a graph used to explain the operation of the camera shake correcting apparatus shown in FIG. 9.

FIG. 21 of the accompanying drawings is a graph of a gain in the open loop where the ordinate axis represents gain (dB) and the abscissa axis represents frequency (ω). As shown in FIG. 21, when the gain is 0 dB and the frequency ω is K$_t$K$_s$/RJ, the gain in the open loop becomes substantially—6 dB/oct.

Therefore, a gain in the closed loop can be expressed by the following equation (6):

$$G_{close}(S) = \frac{G_o/K\theta}{1 + G_o} \quad (6)$$

$$= \frac{1}{\frac{1}{K_r}\left[\frac{RJ}{K_t}S^2 + \left(\frac{RD}{K_t} + K_s\right)S + \frac{RK_y}{K_t}\right] + K\theta}$$

$$= \frac{1}{\frac{RJ}{K_r K_t}S^2 + \frac{1}{K_r}\left(\frac{RD}{K_t} + K_s\right)S + \left(\frac{RK_y}{K_r K_t} + K\theta\right)}$$

Comparison of equation (6) with equation (3), which expresses the gain in the closed loop of the servo in the prism assembly 7 of the camera shake correcting apparatus according to the first embodiment, reveals that in the closed loop of the servo of the prism assembly 7 in the camera shake correcting apparatus of this embodiment expressed in equation (6), because of the addition of the velocity feedback gain K$_s$, a first-order term becomes larger than a zero-order term so that 1/aS$_2$ +bS+c can be approximated to 1/S(aS+b) more accurately. Also, in the low band, a first-order characteristic of—6 dB/oct can be presented as shown in FIG. 21.

Further, D (viscosity) and K$_y$ (spring constant) that are causes of the nonlinearity and temperature dependency can be improved. That is, if the velocity feedback gain K$_s$ is increased, that is, RD/K$_t$<K$_s$, then the influence of the viscosity D can be reduced. If (RD/K$_t$) S>(RK$_y$/K$_t$K$_t$), then the influence of the spring constant Ky can be reduced.

Figure 22:
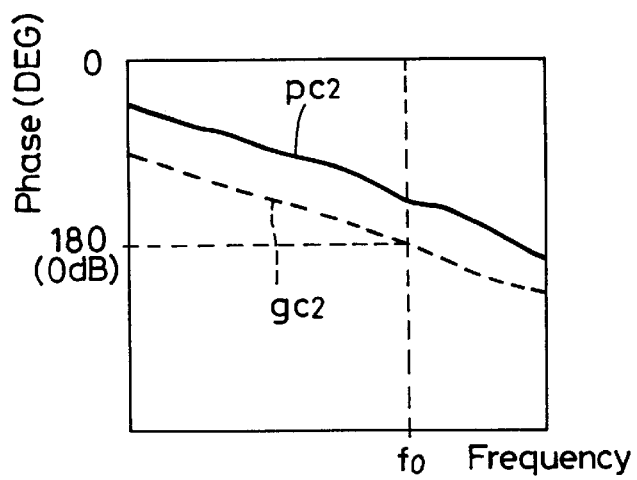
FIG. 22 is a graph used to explain the operation of the camera shake correcting apparatus shown in FIG. 9.

Therefore, in the open loop of the servo of the prism assembly 7 in the camera shake correcting apparatus according to the second embodiment, a phase curve pc2 and a gain curve gc2 are present as shown in FIG. 22. Hence, the phase margin can be increased.

Figure 23:
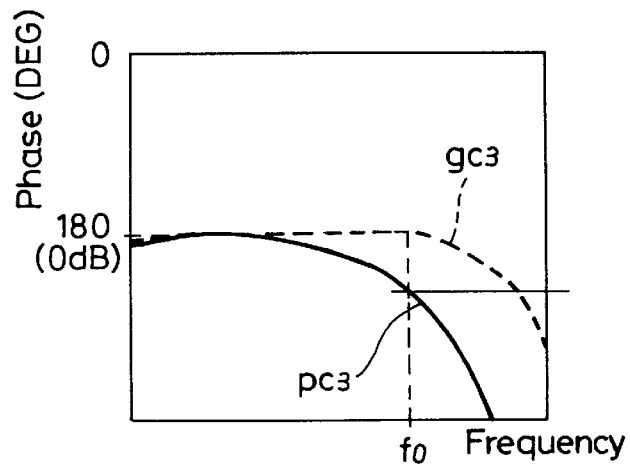
FIG. 23 is a graph used to explain the operation of the camera shake correcting apparatus shown in FIG. 9.

In the closed loop of the servo of the prism assembly 7 in the camera shake correcting apparatus according to the second embodiment of the present invention, a phase curve pc3 and a gain curve gc3 are present as shown in FIG. 23. Hence, the phase margin is decreased.

As described above, according to a second embodiment of the present invention, the damping coils 26 and 32 are disposed in parallel to the prism driving actuators 6 and 15, and the position signals from the angle sensors 8 and 16 are subtracted from the detected signals that are obtained by the angular velocity sensors 1 and 10 when the camera is shaken. Further, the rotational angular velocity signals detected by the damping coils 26, 32 are subtracted from these subtracted results and the actuators 6, 15 are respectively driven by these subtracted results serving as the drive signals. Therefore, the nonlinearity of the prism assembly 7 can be alleviated, and the prism 7 can be moved smoothly and the phase margin of the servo characteristic can be increased. Thus, the camera shake correcting apparatus can be prevented from being affected by the fluctuations of the elements in the mass-production manufacturing process and also can be prevented from being affected by the dependency on temperature.

The camera shake correcting apparatus according to a third embodiment of the present invention will be described with reference to FIGS. 24 through 26. Although the control characteristics of the damping coil 26 or 32 in the camera shake correcting apparatus according to the first and second embodiments of the invention are improved, the actuator 6 or 15 interferes with the damping coil 26 or 32 so that a gain margin cannot be obtained sufficiently in the open loop characteristic of the position (angle) control loop. The gain margin tends to be decreased much more with fluctuations of temperature. If the gain margin is decreased too much, there is then the risk that an oscillation will occur. To remove the above-mentioned drawbacks, the actuator 6 or 15 and the damping coil 26 or 32 can be electromagnetically shielded. From a structural standpoint, however, it is almost impossible to electromagnetically shield the actuator 6 or 15 and the damping coil 26 or 32 from each other.

According to the third embodiment of the present invention, a voltage proportional to a current flowing through the actuator 6 or 15 is differentiated and a voltage signal induced by the interference of the damping coil 26 or 32 is generated. A differentiated signal that is obtained by differentiating the voltage proportional to the current flowing through the actuator 6 or 15 is subtracted from the voltage induced when the actuator 6 or 15 interferes with the damping coil 26 or 32, thereby effecting the neutralization processing. Therefore, the characteristics can be prevented from being deteriorated when the actuator 6 or 15 interferes with the damping coil 26 or 32. Thus, the inherent characteristics of the camera shake correcting apparatus can be effectively maximized. Also, the damping efficiency of the damping coil 26 or 32 can be increased and can be controlled satisfactorily regardless of fluctuating factors, such as a change of temperature or the like.

Figure 24:
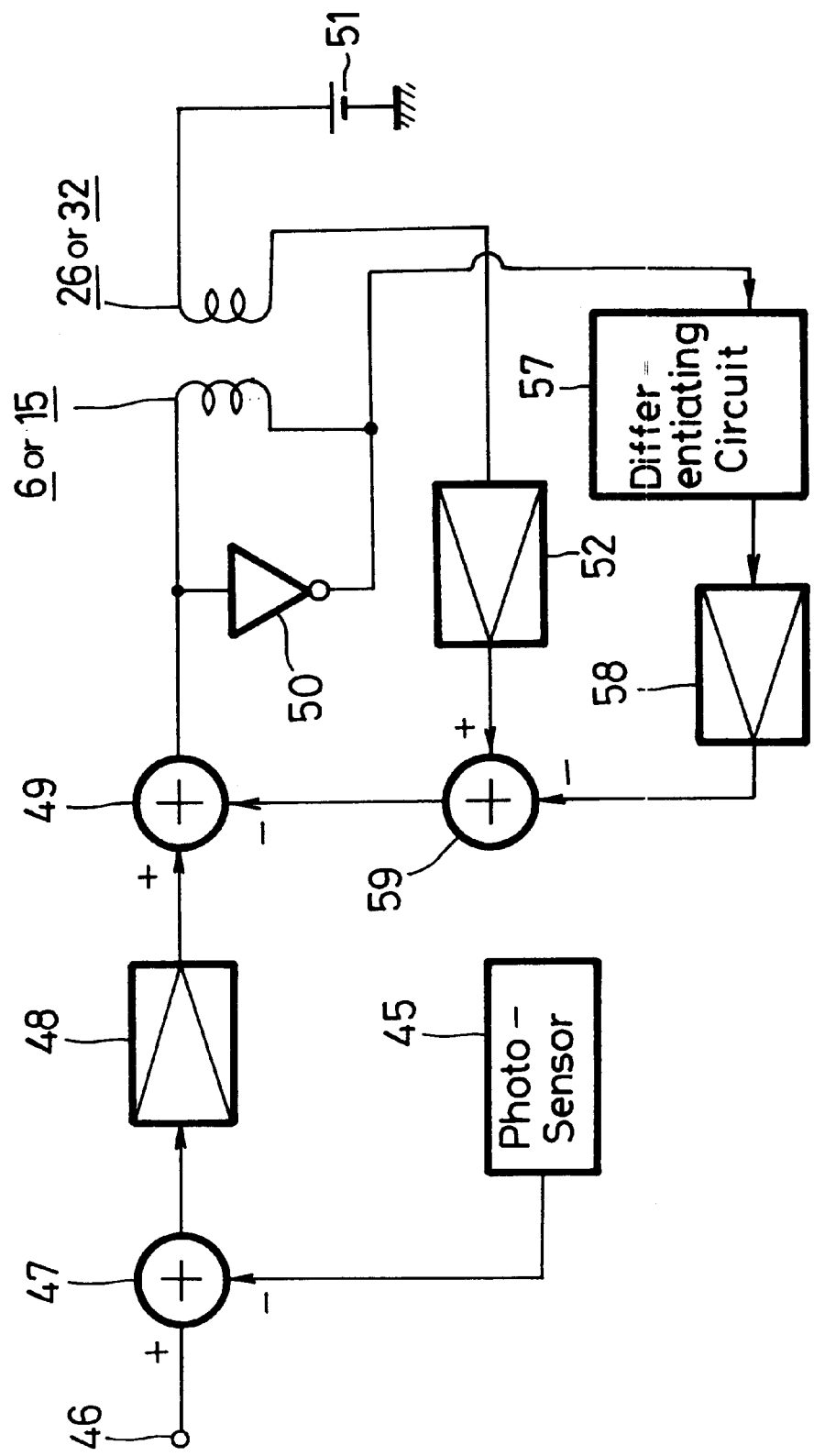
FIG. 24 is a circuit diagram of a main portion of a camera shake correcting apparatus according to a third embodiment of the present invention.
Figure 25:
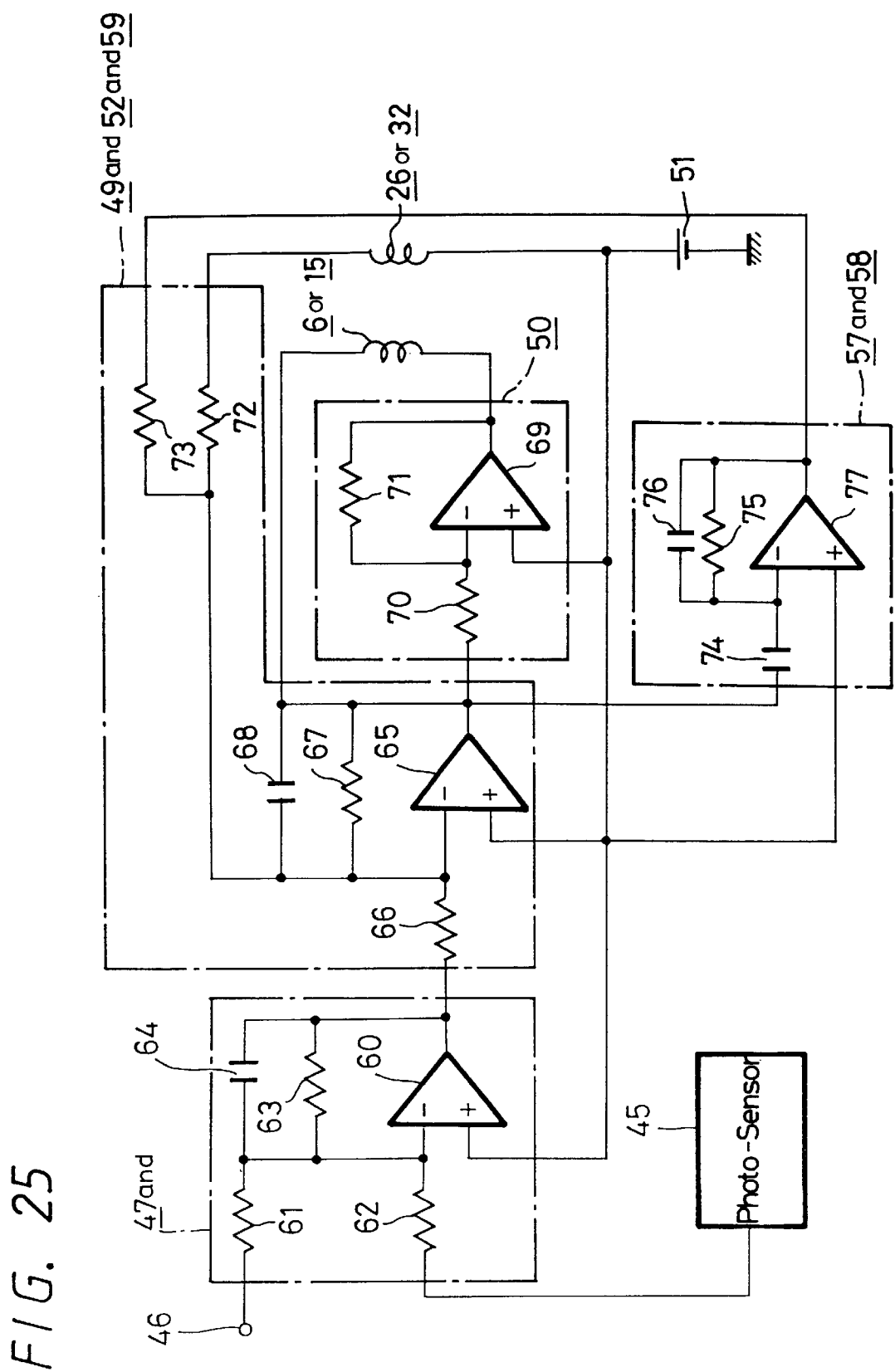
FIG. 25 is a circuit diagram of a main portion of the camera shake correcting apparatus shown in FIG. 24.
Figure 26:
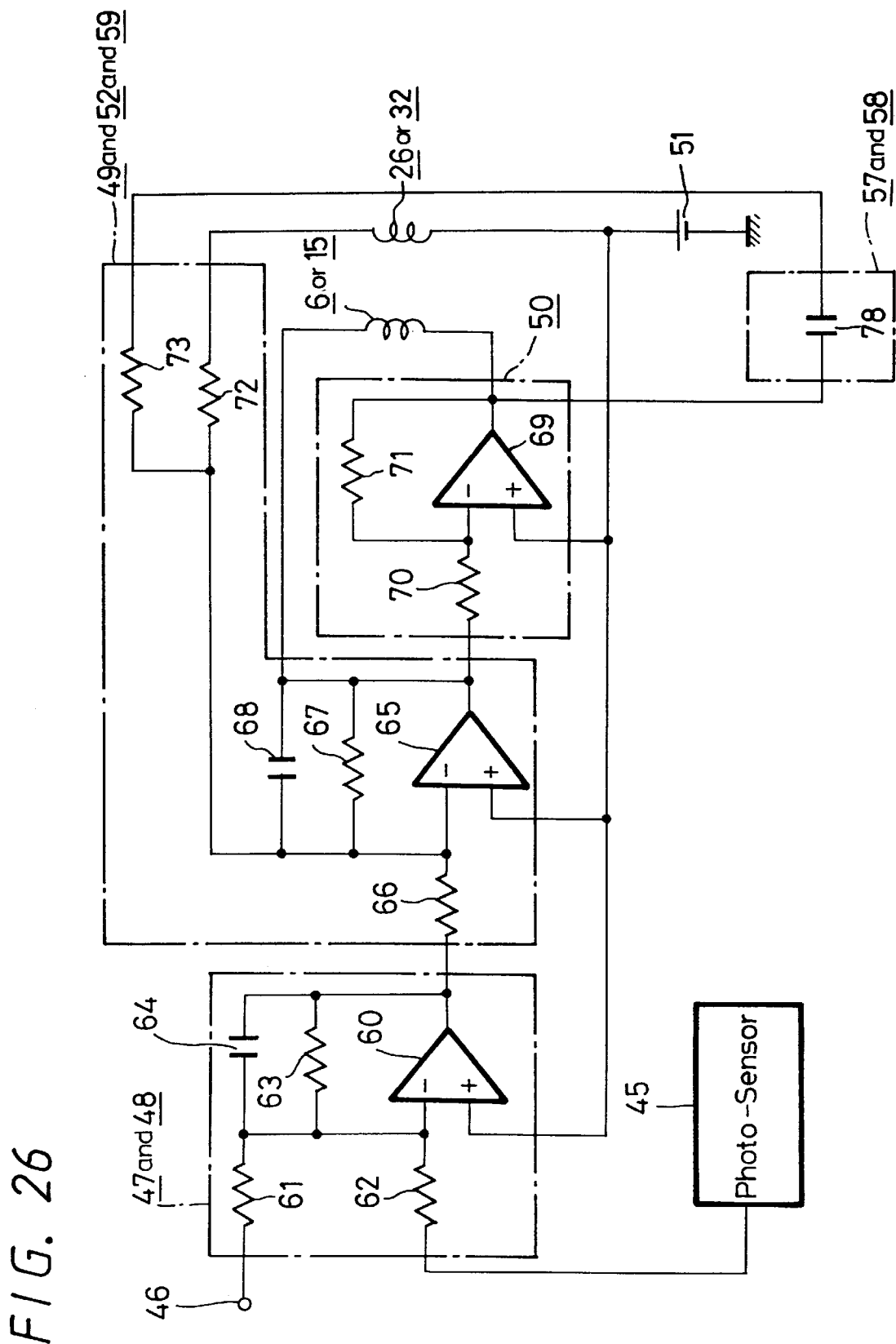
FIG. 26 is a circuit diagram of a modified version of the circuit shown in FIG. 25.

The third embodiment of the present invention is shown in FIGS. 24 through 26, in which like parts corresponding to those of FIGS. 15 and 16 are marked with the same reference numerals and need not be described in detail. As shown in FIG. 24, unlike the example of the circuit arrangement of the main portion of the camera shake correcting apparatus shown in FIG. 15, the signal flowing through the actuator 6 or 15 is differentiated by a differentiating circuit 57 and a differentiated signal is supplied through the amplifying circuit 58 to the adding circuit 59. The adding circuit 59 subtracts this differentiated actuator signal from the signal supplied thereto flowing through the damping coil 26 or 32 and the amplifying circuit 52. The resultant difference signal is supplied to the minus input of the adding circuit 49. The instruction signal or shake detection signal, such as produced by circuit 20 of FIG. 9, is supplied to the input terminal 46 and thence to the adding circuit 47. The adding circuit 47 subtracts the detected signal of the photo-sensor 45 from the instruction signal and the difference signal is supplied through the amplifying circuit 48 to the plus input of the adding circuit 49.

In the operation, then, the output of the actuator 6 or 15 is differentiated by the differentiating circuit 57, thereby producing a differentiated signal that is supplied through the amplifying circuit 58 to the adding circuit 59. The adding circuit 59 is also supplied with the voltage proportional to the rotational angular velocity from the damping coil 26 or 32 through the amplifying circuit 52. The adding circuit 59 subtracts from the signal supplied from the damping coil 26 or 32 through the amplifying circuit 52 the output from the actuator 6 or 15 that was differentiated by the differentiating circuit 57 through the amplifying circuit 58, that is, the voltage induced by the damping coil 26 or 32 upon interference. A difference signal is supplied to the adding circuit 49. The subtraction in the adding circuit 49 is equal to the so-called neutralization processing, where the control efficiency that was deteriorated when the actuator 6 or 15 interfered with the damping coil 26 or 32 can be alleviated. The adding circuit 49 subtracts from the signal supplied thereto from the adding circuit 47 through the amplifying circuit 48 the subtracted signal supplied thereto from the actuator 6 or 15 through the differentiating circuit 57 and the amplifying circuit 58. A subtracted signal is supplied to the actuator 6 or 15 and the inverting circuit 50.

Therefore, the drive signal from the adding circuit 49 is supplied to one end of the actuator 6 or 15 and the signal from the inverting circuit 50 is supplied to the other end of the actuator 6 or 15, whereby a current flows through the actuator 6 or 15 to generate a magnetic flux, thereby rotating the bobbin 41 and, thus, the glass plate 7a or 7b.

An example of a circuit arrangement of a main portion of the camera shake correcting apparatus shown in FIG. 24 will be described with reference to FIG. 25, in which parts and elements identical to those of FIG. 16 are marked with the same reference numerals and need not be described in detail.

As shown in FIG. 25, the output terminal of the operational amplifier circuit 65 is connected through a capacitor 74 to an inverting input (−) of an operational amplifier circuit 77 forming the differentiating circuit 57 and the amplifying circuit 58. The inverting input terminal (−) and the output of the operational amplifier circuit 77 are connected together via a parallel circuit of a resistor 75 and a capacitor 76. The output of the operational amplifier circuit 77 is connected through a resistor 73 to a junction between the inverting input (−) of the operational amplifier circuit 65 and a resistor 72. The capacitor 74 and the resistor 75 constitute the differentiating circuit 57, and the capacitor 76 acts as an active low-pass filter. The resistor 73 determines an adding ratio and forms the adding circuit 59.

According to the above-mentioned circuit arrangement, the output of the operational amplifier circuit 65, which is the voltage proportional to the current flowing through the actuator 6 or 15, is differentiated by the capacitor 74.and the resistor 75 and then amplified by the operational amplifier circuit 77. Thereafter, the differentiated signal is subtracted from the signal of the damping coil 26 or 32 by the resistor 73 forming the adding circuit 59, thereby to prevent the characteristics from being deteriorated when the actuator 6 or 15 interferes with the damping coil 26 or 32.

FIG. 26 shows a further example of the circuit arrangement shown in FIG. 25, in which one end of the capacitor 78 that forms the differentiating circuit 57 and the amplifying circuit 58 is connected to the output of operational amplifier 69. The other end of the capacitor 78 is connected to a junction between the inverting input terminal (−) of the operational amplifier circuit 65 and the resistor 72 through the resistor 73, which is used to determine the adding ratio of the adding circuit 59 that it forms.

Also in the case of the above circuit arrangement, similar to the circuit shown in FIG. 25, the output of the operational amplifier circuit 71, which is the voltage proportional to the current flowing through the actuator 6 or 15, is differentiated by the capacitor 74 and then amplified. Thereafter, the differentiated signal is subtracted from the signal of the damping coil 26 or 32 by the resistor 73 constructing the adding circuit 59 to thereby prevent the characteristics from being deteriorated when the actuator 6 or 15 interferes with the damping coil 26 or 32.

FIG. 27 is a signal flow diagram showing the condition that the so-called neutralization processing described with reference to FIGS. 24 to 26 has not yet been effected. As shown by an interference magnitude coefficient—Kis in FIG. 27, the actuator 6 or 15 interferes with the damping coil 26 or 32, which causes the characteristics to be deteriorated.

FIG. 28 is a signal flow diagram showing the condition that the so-called neutralization processing described with reference to FIGS. 24 through 26 is effected. Although the actuator 6 or 15 interferes with the damping coil 26 or 32 as shown by an interference magnitude coefficient—Kis in FIG. 28, the neutralization processing described in FIGS. 24 to 26, shown by a neutralization magnitude coefficient Kcs can prevent the characteristics from deteriorating when the actuator 6 or 15 interferes with the damping coil 26 or 32. At that time, a relationship between the interference coefficient Kis and the neutralization coefficient Kcs must be set as Kis≦Kcs. If the above-mentioned relationship is set as Kis>Kcs, then local positive feedback is effected and oscillation occurs.

Figure 29:
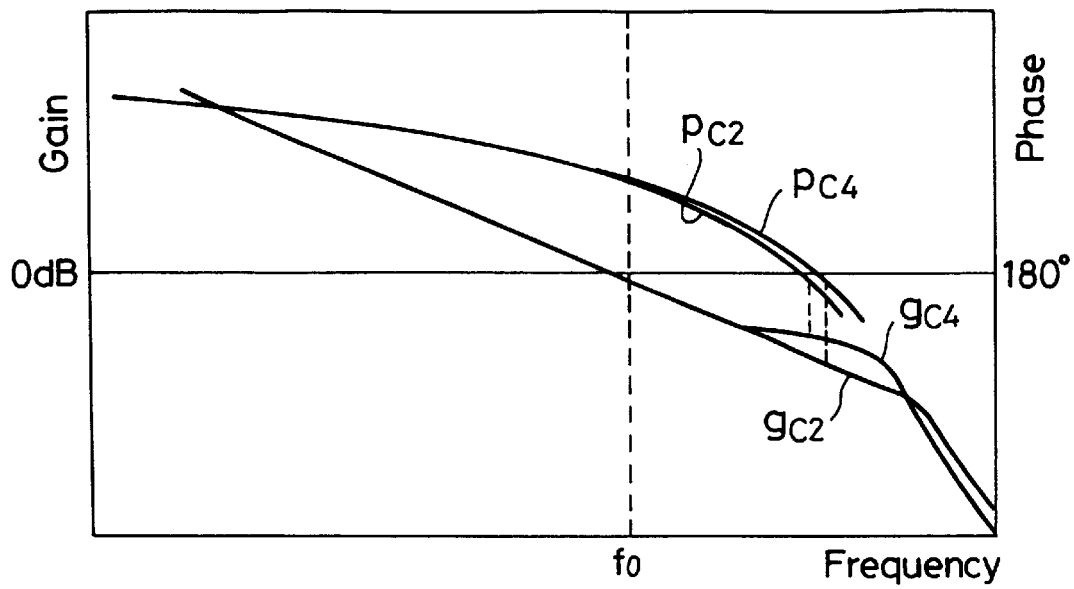
FIG. 29 is a graph used to explain the operation of the camera shake correcting apparatus shown in FIG. 24.

FIG. 29 is a graph of a characteristic of the open loop under the condition that the neutralization processing is effected. When the neutralization processing is effected, as will be clear from a phase curve pc4 and a gain curve gc4, the gain margin can be increased remarkably as compared with the phase curve pc2 and the gain curve gc2 shown in FIG. 22 where neutralization processing is not effected.

Figure 30:
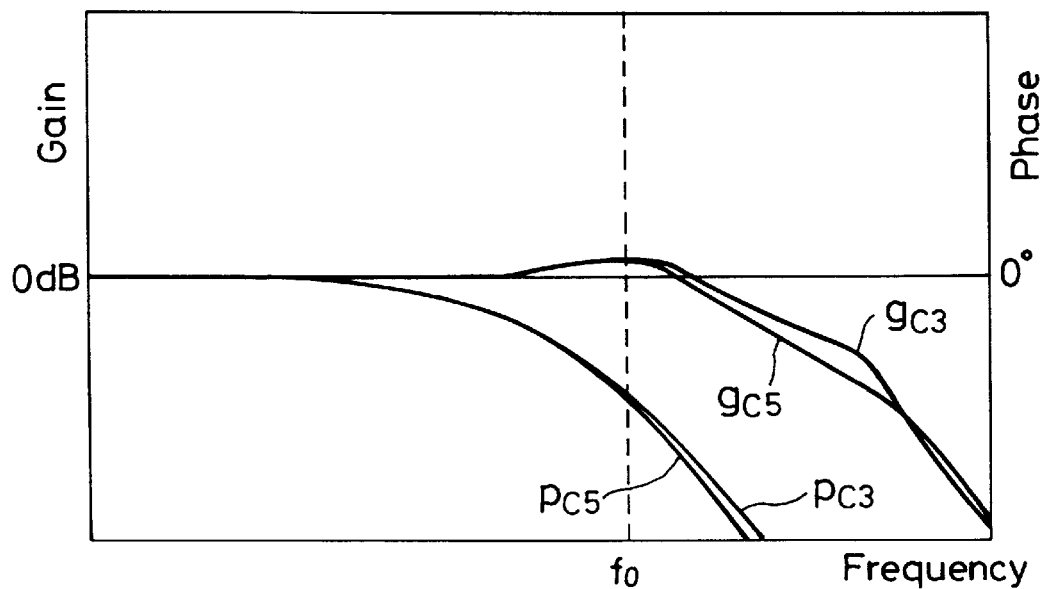
FIG. 30 is a graph used to explain the operation of the camera shake correcting apparatus shown in FIG. 24.

FIG. 30 shows a characteristic of the closed loop under the condition that the neutralization processing is effected. As will be clear from a phase curve pc5 and a gain curve gc5 shown in FIG. 30, the phase margin is not substantially deteriorated as compared with the phase curve pc3 and the gain curve gc3 shown in FIG. 23, where the neutralization processing is not effected.

Since the differentiated signal, which results from differentiating the voltage proportional to the current flowing through the actuator 6 or 15, is subtracted from the voltage induced when the actuator 6 or 15 interferes with the damping coil 26 or 32 to thereby effect the so-called neutralization processing as described above, the characteristics can be prevented from being deteriorated when the actuator 6 or 15 interferes with the damping coil 26 or 32. The inherent characteristics can be maximized and the damping efficiency of the damping coil 26 or 32 can be improved. Also, the camera shake correcting apparatus can be controlled satisfactorily regardless of the changes in temperature or the like.

Thus, according to the present invention the camera shake that takes place when the cameraman takes a picture using a video camera can be corrected optically. Further, since the variable angular prism is driven in response to the detected results from the position detecting means and the velocity detecting means, the nonlinearity of the variable angular prism can be driven smoothly and the phase margin serving as the servo characteristic can be increased. Therefore, the variations in the values and dimensions of the elements that occur in the mass-production manufacturing process can be reduced. Thus, the camera shake correcting apparatus can be made substantially independent of temperature characteristics.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. A camera shake correcting apparatus comprising:

a variable angular prism including yaw and pitch glass plates in spaced relation with a viscous light transmission medium sealingly arranged therebetween for changing a refracting angle of said prism by changing a relative angle between said glass plates in response to yaw and pitch angular prism drive signals to thereby change a refraction angle of light passing through said prism, wherein said glass plates are sealingly bonded to a bellows-like spring portion filled with the viscous light transmission medium;

prism angle position detecting means for detecting a horizontal angular position of said yaw glass plate and producing a yaw position signal and a vertical angular position of said pitch glass plate and producing a pitch position signal;

camera shake amount detecting means for detecting an amount of camera shake of at least a horizontal and a vertical motion of a camera and producing yaw and pitch motion signals;

damping coil means attached respectively to said yaw and pitch glass plates for producing yaw and pitch damping signals;

calculating means for calculating said yaw and pitch angular prism drive signals based on said yaw and pitch motion signals produced by said camera shake detecting means, said yaw and pitch position signals produced by said prism angle position detecting means, and said yaw and pitch damping signals produced by said damping coil means, and generating said yaw and pitch angular prism drive signals;

variable angular prism drive means for driving said prism by rotationally driving said yaw and pitch glass plates in response to said yaw and pitch angular prism drive signals; and a differentiating loop connected between an output and an input of said variable angular prism drive means for reducing interference between said variable angular prism drive means and said damping coils, said differentiating loop including a differentiating circuit and an amplifying circuit.

2. A camera shake correcting apparatus according to claim 1, wherein said damping coil means includes a yaw damping coil circuit for detecting a rotational angular velocity of said yaw glass plate attached thereto, and a pitch damping coil circuit for detecting a rotational angular velocity of said pitch glass plate attached thereto, said camera shake amount detecting means includes a horizontal angular velocity sensor for detecting a yaw angle and producing a yaw motion signal, a vertical angular velocity sensor for detecting a pitch angle and producing a pitch motion signal, and integrating means for integrating said yaw and pitch motion signals fed to said calculating means, and said differentiating loop further includes an adding circuit and wherein said output of said variable angular prism drive means is differentiated by said differentiating circuit to produce a differentiated signal that is supplied through said amplifying circuit to said adding circuit to be added to said yaw and pitch angular prism drive signals.

3. A camera apparatus comprising:

a variable angular prism including yaw and pitch glass plates in spaced relation with a light transmission medium sealingly arranged therebetween for changing a refracting angle of said prism by changing a relative angle between said glass plates in response to yaw and pitch angular prism drive signals to thereby change a refraction angle of light passing through said prism;

prism angle position detecting means for detecting a horizontal angular position of said yaw glass plate and producing a yaw position signal and a vertical angular position of said pitch glass plate and producing a pitch position signal;

camera shake amount detecting means for detecting an amount of camera shake of at least a horizontal and a vertical motion of a camera and producing yaw and pitch motion signals;

a velocity feedback loop comprising damping coils attached respectively to said yaw and pitch glass plates for producing yaw and pitch damping signals, each of said damping coils being wound on respective bobbins;

calculating means for calculating said yaw and pitch angular prism drive signals based on said yaw and pitch motion signals produced by said camera shake detecting means, said yaw and pitch position signals produced by said prism angle position detecting means, and said yaw and pitch damping signals produced by said damping coil means, and generating said yaw and pitch angular prism drive signals;

variable angular prism drive coils attached respectively to said yaw and pitch glass plates for driving said prism by rotationally driving said yaw and pitch glass plates in response to said yaw and pitch angular prism drive signals, each of said drive coils being wound on said respective bobbins along with said damping coils; and image pickup means for focusing and converting said light passing through said variable angular prism into a video signal, wherein each of said damping coils of said velocity feedback loop has associated therewith a photodiode and a photosensor, and each of said bobbins has an arm extending therefrom, said arm having a position detecting hole formed therein and positioned between said photodiode and said photosensor such that light emitted from said photodiode passes through said hole to said photosensor, and a position of said emitted light on said photosensor depends on a position of said bobbins, said photosensor providing an output signal to said camera shake amount detecting means.

4. A camera apparatus according to claim 3, wherein each of said bobbins have spacers separating said damping coils and said drive coils wound thereon to prevent crosstalk between said damping coils and said drive coils.

* * * * *